United States Patent
Richards

(10) Patent No.: US 9,335,614 B2
(45) Date of Patent: May 10, 2016

(54) PROJECTION SYSTEMS AND METHODS USING WIDELY-SPACED PROJECTORS

(75) Inventor: Martin J. Richards, Redwood City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 201 days.

(21) Appl. No.: 14/123,951

(22) PCT Filed: Jun. 7, 2012

(86) PCT No.: PCT/US2012/041230
§ 371 (c)(1),
(2), (4) Date: Dec. 4, 2013

(87) PCT Pub. No.: WO2012/173851
PCT Pub. Date: Dec. 20, 2012

(65) Prior Publication Data
US 2014/0204186 A1    Jul. 24, 2014

Related U.S. Application Data

(60) Provisional application No. 61/496,497, filed on Jun. 13, 2011.

(51) Int. Cl.
*G03B 21/14* (2006.01)
*G03B 35/20* (2006.01)
(Continued)

(52) U.S. Cl.
CPC ............ *G03B 21/147* (2013.01); *G03B 21/26* (2013.01); *G03B 35/20* (2013.01); *G03B 37/04* (2013.01);
(Continued)

(58) Field of Classification Search
CPC ...... G03B 21/147; G03B 35/20; G03B 21/26; G03B 37/04; G03B 21/14; H04N 9/3147; H04N 13/0459; H04N 9/3185; H04N 13/0011; H04N 13/0018
See application file for complete search history.

(56) References Cited

U.S. PATENT DOCUMENTS 4,025,160 A    5/1977  Martinez
5,175,575 A   12/1992  Gersuk
(Continued)

FOREIGN PATENT DOCUMENTS

CN    1873526    12/2006
EP    0778483     6/1997
(Continued)

OTHER PUBLICATIONS

"Reference Fixed Projector Screen Specs" Dec. 30, 2010 http://web.archive.org/web/20101230025.
(Continued)

*Primary Examiner* — Sultan Chowdhury
*Assistant Examiner* — Magda Cruz
(74) *Attorney, Agent, or Firm* — Larry E. Henneman, Jr.; Henneman & Associates, PLC

(57) ABSTRACT

A theater utilizes multiple projectors that are widely spaced. The wide spacing of the projectors reduces hot spotting that occurs on flat, curved, retro-reflective, and other types of screens. The projectors are spaced widely apart and generally are placed at opposite sides of the theater. The wide spacing causes a trapezoidal distortion or effect which may be electronically compensated for by, for example, changing pixel locations on modulators of the projectors such that same (or corresponding) pixels modulated in both projectors are ultimately projected onto a same pixel area of the screen. The invention is particularly advantageous in polarization based 3D systems which generally require high directivity screens where hot spotting and related crosstalk are common.

23 Claims, 20 Drawing Sheets

(51) Int. Cl.
*G03B 21/26* (2006.01)
*G03B 37/04* (2006.01)
*H04N 9/31* (2006.01)
*H04N 13/04* (2006.01)

(52) U.S. Cl.
CPC .......... *H04N 9/3147* (2013.01); *H04N 9/3185* (2013.01); *H04N 13/0434* (2013.01); *H04N 13/0459* (2013.01)

(56) References Cited

U.S. PATENT DOCUMENTS

| | | | |
|---|---|---|---|
| 5,189,452 | A | 2/1993 | Hodson |
| 5,376,980 | A | 12/1994 | Gersuk |
| 5,541,769 | A | 7/1996 | Ansley |
| 6,381,068 | B1 | 4/2002 | Harada |
| 6,483,643 | B1 | 11/2002 | Zuchowski |
| 6,771,272 | B2 | 8/2004 | Deering |
| 6,934,080 | B2 | 8/2005 | Saccomanno |
| 7,239,445 | B2 | 7/2007 | Pouslen |
| 7,688,347 | B2 | 3/2010 | Dolgoff |
| 7,784,938 | B2 | 8/2010 | Richards |
| 7,898,734 | B2 | 3/2011 | Coleman |
| 2006/0033890 | A1 | 2/2006 | Hasegawa |
| 2008/0143964 | A1 | 6/2008 | Cowan |
| 2009/0185139 | A1* | 7/2009 | Morikuni ............... G03B 21/26 353/30 |
| 2009/0219381 | A1* | 9/2009 | Ayala ................ H04N 13/0011 348/43 |
| 2012/0127320 | A1* | 5/2012 | Balogh ........................ 348/180 |

FOREIGN PATENT DOCUMENTS

| | | |
|---|---|---|
| EP | 1137293 | 9/2001 |
| JP | 2005-062314 | 3/2005 |
| JP | 2005-080261 | 3/2005 |
| JP | 2005-107011 | 4/2005 |
| JP | 2008-102193 | 5/2008 |
| JP | 2009-053644 | 3/2009 |
| JP | 2009-116289 | 5/2009 |
| WO | 97/01787 | 1/1997 |
| WO | 2011/012913 | 2/2011 |

OTHER PUBLICATIONS

Lipton, Lenny "High Brightness Film Projection System" Proc. SPIE, vol. 7863, Feb. 15, 2011, San Francisco, CA USA.

* cited by examiner

PROJECTION SYSTEMS AND METHODS USING WIDELY-SPACED PROJECTORS

CROSS-REFERENCE TO RELATED APPLICATIONS

This application claims priority to U.S. Patent Provisional Application No. 61/496,497, filed 13 Jun. 2011, hereby incorporated by reference in its entirety.

BACKGROUND OF THE INVENTION

1. Field of Invention

The present invention relates to screens for displays of images and more particularly to screens used for the display and viewing of motion pictures including 3D cinema.

2. Discussion of Background

Screens for viewing cinema and other images are available in a wide range of structures and properties. The directivity of a screen relates to the amount or angle of specular reflection of light from the screen. In 2D cinema applications, the directivity of the viewing screen often has broad Gaussian like properties which reduce the apparent brightness of the screen (to an individual viewer), but maintain a very consistent relative image brightness across the screen at various angles such that image quality is consistent between the front, back, middle, and sides of the typical viewing audience.

In some 3D applications, such as polarization based systems, screens with high directivity are utilized because they have the capability of preserving polarization when light is reflected off the screen. Changes in polarization will typically cause crosstalk between the separately polarized left and right eye channels and thereby erode or even destroy the "3D" effect. However, such high directivity screens also produce undesirable effects such as hot spots and less uniform relative illumination across the screen. These problems can be exasperated at oblique viewing angles such that some viewing/seating positions in the theater may be less desirable or undesirable.

Spectral separation provides separation at the projector by filtering the left and right eye spectrally. The system differs from anaglyph in that the filters for the left and right eye each pass a portion of the red, green, and blue spectrum, providing for a full color image, and further differs from polarization based systems in that highly directive (or polarization preserving) screens are not needed, but can be utilized if the expense of greater hot spotting is deemed acceptable. The band pass spectrum of the left eye filter is complementary to the band pass spectrum of the right eye filter. The eyewear consists of filters with the same general spectral characteristics as are used in the projector.

All of the above methods for providing left/right eye separation for a 3D Stereoscopic presentation can be used with either two projectors (e.g., one for the left eye and one for the right eye), or may be used with a single D-Cinema projector system. In the dual projection system, the projection filter (e.g. spectral filter or polarization control) may be static or dynamic and may be located in front of the projection lens or inside the projector. In both 2D and 3D systems using dual projectors, the projectors are placed in close proximity to enhance alignment and uniformity of the projected images.

SUMMARY OF THE INVENTION

The present inventor has realized the need to reduce hot spotting, particularly with the use of highly directive screens so that they may be more successfully implemented in 2D and 3D displays such as cinema and home theater applications. One result of the invention is the provision of higher reflectivity/directivity to a screen being utilized, increasing overall brightness but maintaining uniformity of the relative brightness across the screen.

In one embodiment, the present invention provides a projection system, comprising a screen and at least two widely spaced digital projectors. The screen may comprise, for example, any of a high gain screen, a retro-reflective screen, and/or a curved screen. The system may include a compensation mechanism configured to adjust for trapezoidal effect caused by projecting images from the two widely spaced digital projectors. The compensation mechanism comprises shifting where pixels of an image to be projected are modulated on modulators of at least one of the projectors such that the pixels of both projectors are projected onto a same portion of the screen. The compensation mechanism may comprise an electronic compensation effected on modulators of the projectors and modifications of an optical path from the modulators to the screen.

The projectors may be spaced as widely as possible within a theater in which the system is installed and within any limitations of the compensation mechanism. In one embodiment, the projectors are spaced more than two projector widths apart. The projection system may comprise a polarization based 3D projection system. The at least two widely spaced projectors may comprise an array of 3 or more widely spaced projectors. The projectors may be laser based projectors. The projection system may comprise a Visual Dynamic Range (VDR) (reproducing the images to the same extent as the adapted human eye capabilities) based projection system. The widely spaced projectors may be positioned on opposing sides at a rear of a theater, on side walls of a theater, or positioned on a ceiling or floor (e.g., in aisles) of the theater.

The invention includes a trapezoidal effect mechanism that operates on images of widely spaced projectors. The invention includes a controller or other processor at any point in an image data pipeline configured to trapezoidally adjust image data according to widely spaced projectors. The adjustments may be fixed to pre-specified standard adjustments, but are preferably customized for each projector and/or theater installation. The invention includes any modulation scheme for energizing a modulator of a projection system to compensate for a trapezoid effect incurred due to wide spacing of the projectors according to the invention.

The invention includes multiple sets of widely spaced projectors comprising, for example, two projectors projecting from a rear of a theater and two projectors projecting from opposite walls of the theater.

Any of the embodiments described herein may include where the projectors are configured to alternate between projecting right and left channel images of a 3D image or motion picture.

The present invention may also be embodied as a projection system comprising a first projector and a second projector spaced apart more than one projector width, wherein the first projector is configured to project a first direction trapezoidal corrected image and the second projector is configured to project a second direction trapezoidal corrected image.

The trapezoidal corrections may comprise corrections for image registration errors caused by more than 5 feet of separation between the projectors. The trapezoidal corrections may comprise corrections for image registration errors caused by placement of the projectors at opposite side walls of the theater and more than 5 feet of separation.

The first projector may be positioned closer to a first side wall of a theater than a center of the theater and the second projector may be positioned closer to an opposite side wall of the theater than the center. In one embodiment, the first projector is adjacent to the first side wall and the second projector is adjacent to the opposite side wall. The only space between the projectors and the closest side wall may be, for example, an operation space for maintaining the projectors.

The invention may also be described as display system using a multiple widely spaced projectors onto a high gain screen. Projectors may be configured to display 3D images. The 3D images may be separated by polarization or other techniques (e.g., color or spectral separation). The high gain screen may have, for example, directivity or gain which is greater than 2. The screen may be retro-reflective and may be curved.

The present invention may also be described as a 3D projection system comprising at least 2 projectors and a high gain screen positioned to display images projected by the projectors, a first correction mechanism configured to correct a first trapezoidal effect in images projected by a first of the projectors, a second correction mechanism configured to correct a second trapezoidal effect in images projected by a second of the projectors, a first z-type screen configured to alternate polarization of images projected by the first projector, a second z-type screen configured to alternate polarization of images projected by the second projector, and a controller configured to synchronize each projected image projected by the projectors with a polarization matching a corresponding 3D channel of the projected image. The second trapezoidal effect is, for example, horizontally opposite the first trapezoidal effect. In one embodiment, the at least 2 projectors is an array of 3 or more projectors.

The systems provided by the present invention may be embodied in devices configured to perform the invention, and/or methods designed to practice the invention. For example, a method of displaying images (e.g., 2D and/or 3D images) on a high gain screen with reduced hot spotting (and reduced crosstalk in 3D embodiments). Or, a projection device configured to display images in a high gain screen with reduced hot spotting (and reduced crosstalk in 3D embodiments).

Portions of the device, method, and system may be conveniently implemented in programming on a general purpose computer, or networked computers, and the results may be displayed on an output device connected to any of the general purpose, networked computers, or transmitted to a remote device for output or display (e.g., a cinema theater). In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The use of high gain screens in a cinema is limited because of their lack of uniformity, especially at the edges of the auditorium and screen. This is called "hot spotting". Current screens with reasonable uniformity are limited to a gain of about 1.8. Silver screens have a gain of about 2.4, and suffer from significant hot spotting.

The present invention includes the use of multiple projectors located at the edges of an auditorium (or widely spaced) combined with screens having controlled (e.g., non-Gaussian) directivity to allow the use of screen gains in excess of 3 while maintaining reasonable uniformity across the screen when viewed from various seating positions in an auditorium. The uniformity is improved to the extent that in some embodiments retro reflection screens may also be used.

Placing the projectors at the edges of the auditorium generates some degree of trapezoidal distortion which is corrected by, for example, auto registration (e.g., electronics). While correcting trapezoidal distortion when using film projectors is an issue, those corrections can be performed electronically prior to projection when using digital projection.

Using this method also reduces crosstalk, particularly at the edges of the screen, for polarization systems (e.g., polarization based 3D cinema). Similar advantages may be obtained with a single projector by having a screen with gain characteristics that vary smoothly with screen position. This type of a screen could be constructed, for example, by smoothly varying the gain across the screen.

Figure 1A:
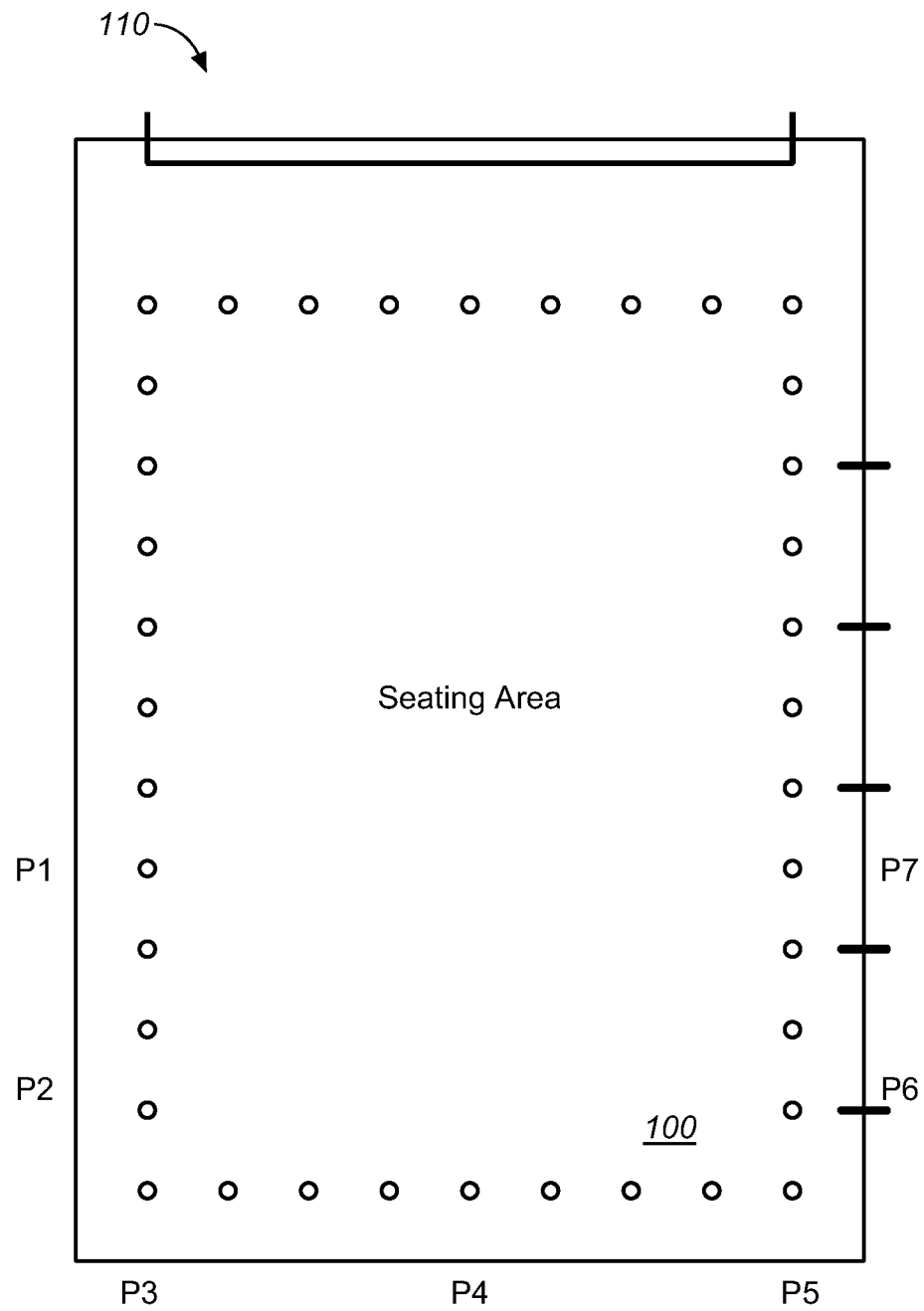
FIG. 1A is a diagram of an arrangement of a cinema theater including exemplary projector locations according to embodiments of the invention.

Referring now to the drawings, wherein like reference numerals designate identical or corresponding parts, and more particularly to FIG. 1A thereof, there is illustrated a diagram of an arrangement of a cinema theater 100 having a seating area and dimensions of approximately 50 ft.×70 ft. and a 40 ft. screen 110. The dimensions will be utilized in FIGS. 1D-2C to describe viewing angles and reflection quality using flat normal (e.g., Gaussian like reflecting properties), retro reflective (retro) flat, and curved normal screens for both worst case (front row end) and mid edge seating positions. The dimensions will again be utilized in FIGS. 3A-4C to describe viewing angles and reflection according to the invention quality using flat normal, normal curved, and retro-reflective flat screens in both worst case and mid edge seats.

Also illustrated are 7 exemplary projector locations. The invention may utilize any of the symmetrically located projector pairs (any of P1/P5, P2/P6, P1/P7) (note: symmetry is a convenience and beneficial, but not a requirement of the invention) and an optional central projector P4. As noted, the locations are exemplary, and any number of placements for similar or additional effect may be utilized (including ceiling and floor mounted projectors, or projectors located closer to the viewing screen).

Projectors P3 and P4 are, for example, separated as far apart as practical which includes having a clear shot to illuminate screen 110. In a 50' wide auditorium, this corresponds to a 25 foot distance from the projector to auditorium center. Projectors P2 and P6 are, for example, mounted on opposite side walls of the theater and forward of the back wall by $\frac{1}{10}^{th}$ a distance to the screen (e.g., approximately 7 feet). Projectors P1 and P7 are, for example, mounted on opposite side walls $\frac{1}{5}^{th}$ a distance to the screen (e.g., approximately 15 feet forward of the back wall). Other distances forward of the back wall may be utilized.

Figure 1B:
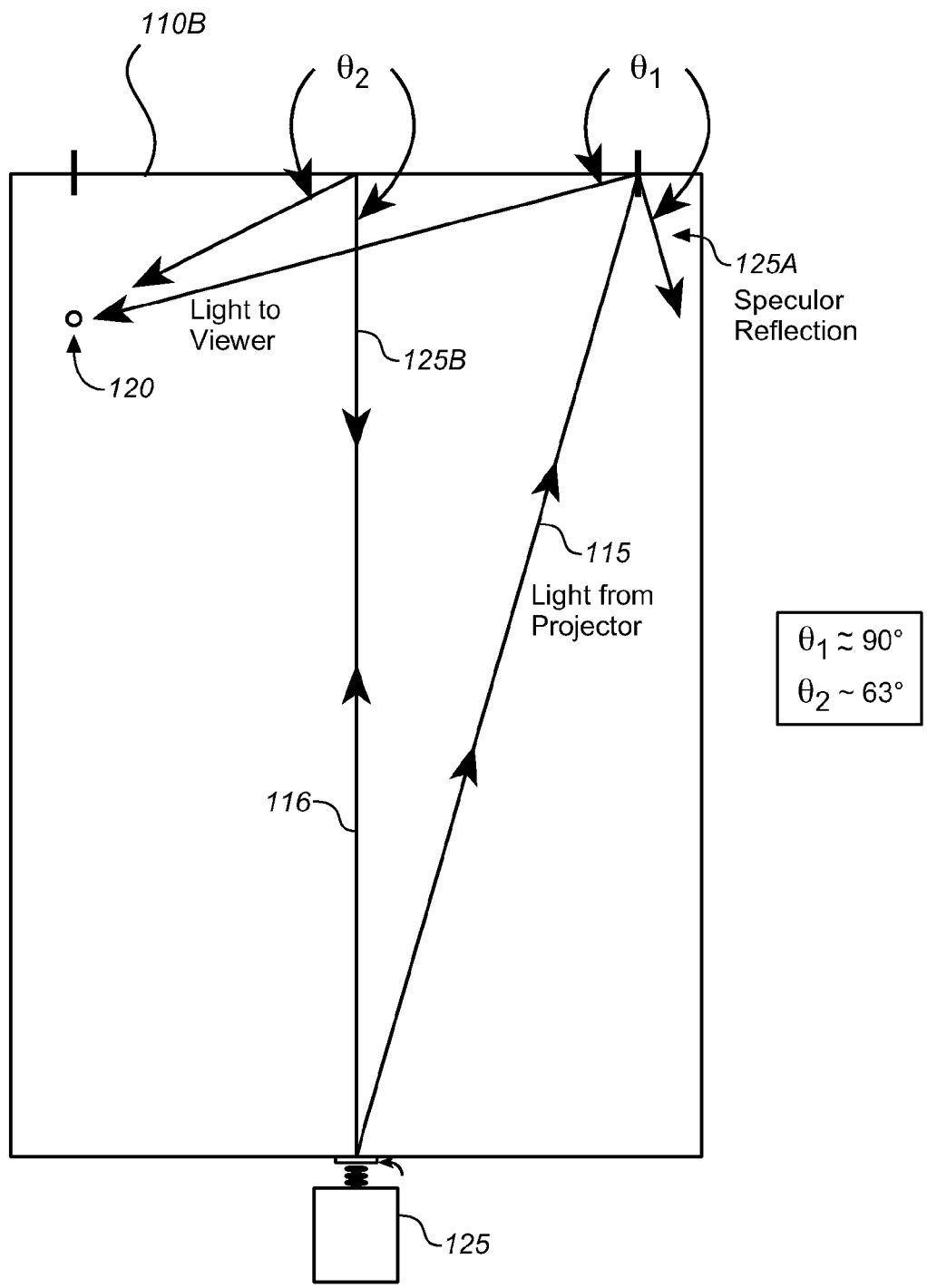
FIG. 1B is a diagram showing reflections in a cinema theater with a flat normal screen for a worst case viewer.

FIG. 1B is a diagram showing reflections in a cinema theater with a flat normal screen 110B for a worst case viewer 120. Light from projector 125 strikes across the screen 110B (e.g., light paths 115 and 116) and is reflected to the worst case viewer 120, most notably at a far end of the screen (angle θ1, the angle between specular reflection 125A and the viewer) and at screen center (angle θ2, the angle between specular reflection 125B, along the incident light path, and the viewer). In this case, θ1=approximately 90 degrees, and θ2=approximately 63 degrees.

Figure 1C:
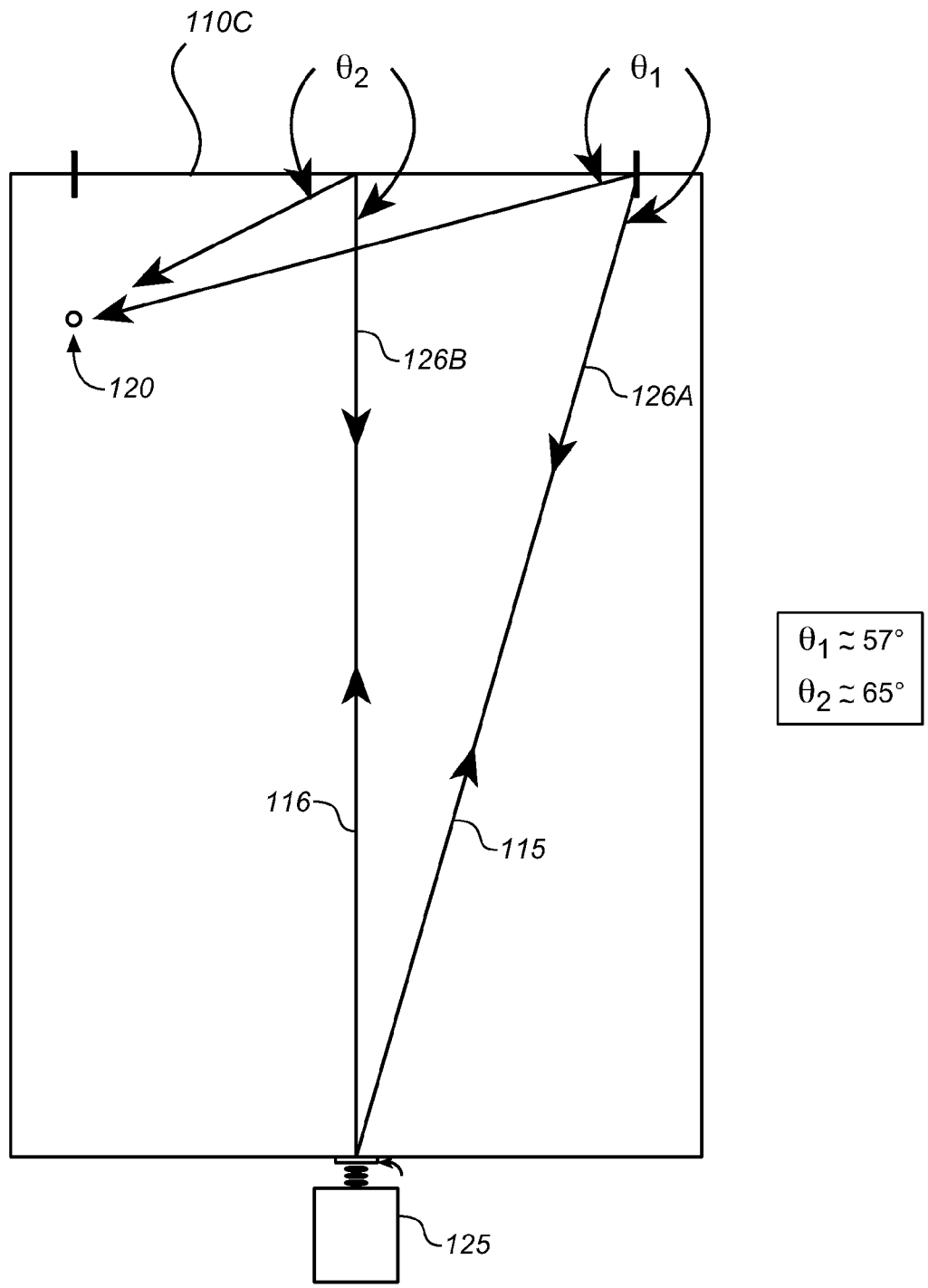
FIG. 1C is a diagram showing reflections in a cinema theater with a retro reflecting screen for a worst case viewer.

FIG. 1C is a diagram showing reflections in a cinema theater with a retro reflecting screen 110C for the worst case viewer 120. For the retro-reflecting screen 110C, in this case, θ1 (the angle between specular reflection 126A and the viewer) =approximately 57 degrees, and θ2 (the angle between specular reflection 126B and the viewer)=approximately 65 degrees.

Figure 1D:
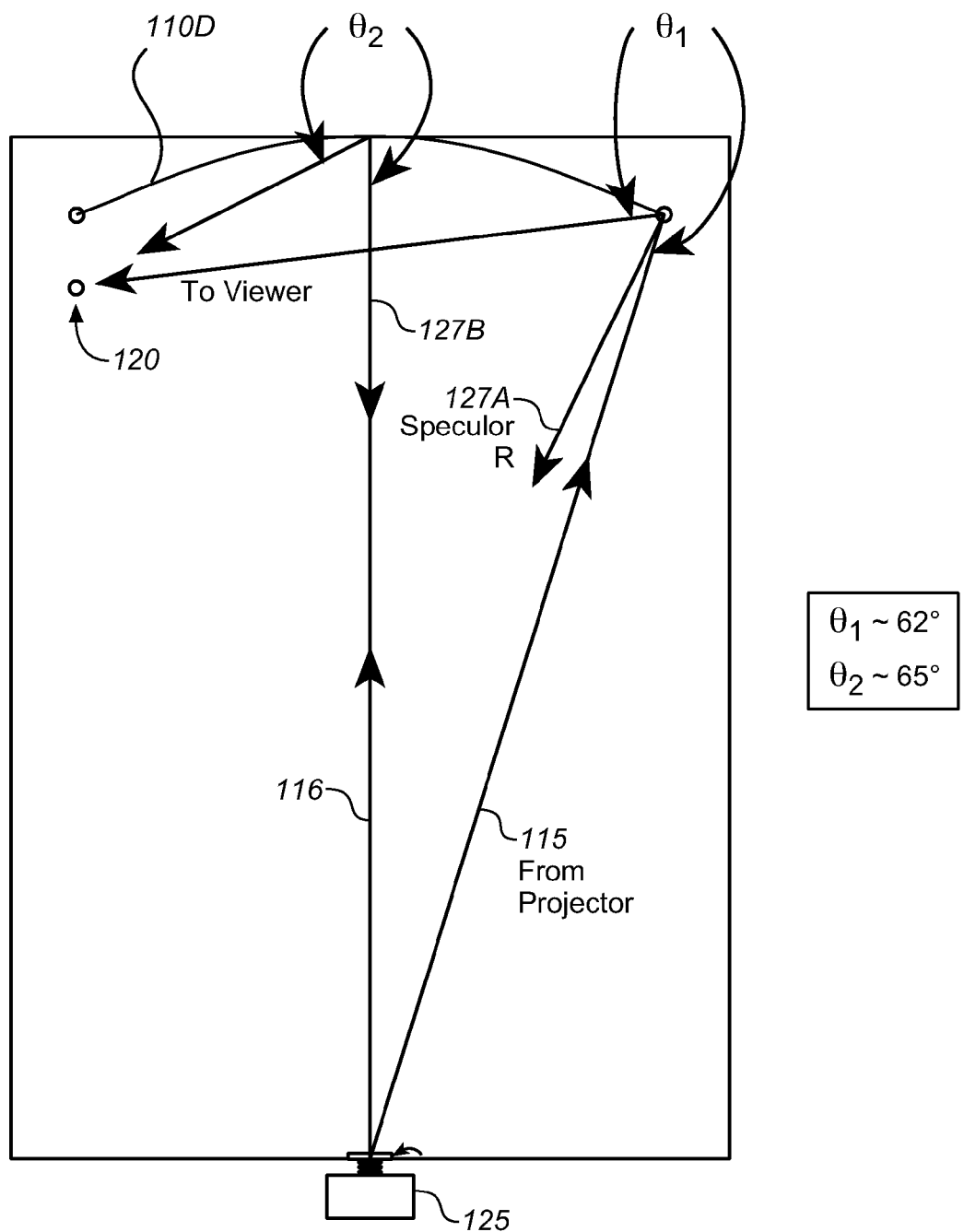
FIG. 1D is a diagram showing reflections in a cinema theater with a curved normal screen for a worst case viewer.

FIG. 1D is a diagram showing reflections in a cinema theater with a curved normal screen 110D for a worst case viewer 120. The curved screen 110D has, for example, a center of radius of curvature close to the projector location. For the curved normal screen 110D, in this case, θ1 (the angle between specular reflection 127A, slightly inward from the incident light path, and the viewer)=approximately 62 degrees, and θ2 (the angle between specular reflection 127B, along incident light path, and the viewer) =approximately 65 degrees.

Figure 2A:
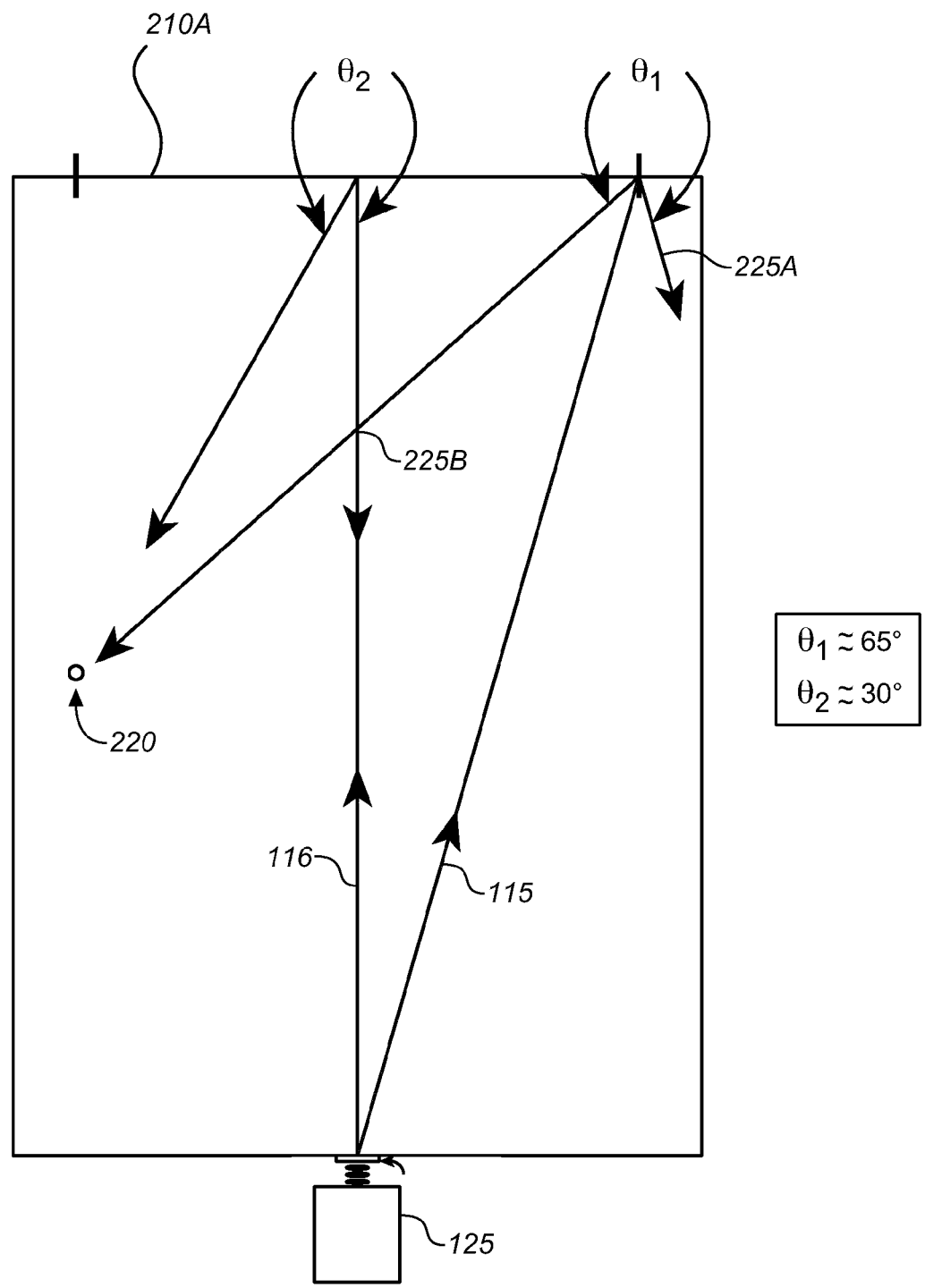
FIG. 2A is a diagram showing reflections in a cinema theater with a flat normal screen for a mid edge viewer.

FIG. 2A is a diagram showing reflections in a cinema theater with a flat normal screen 210A for a mid edge viewer 220. Light from projector 125 strikes across the screen 210A and is reflected to the mid edge viewer 220, most notably at a far end of the screen 210A (angle θ1, the angle between specular reflection 225A and the viewer) and at screen center (angle θ2, the angle between specular reflection 225B, along the incident light path, and the viewer). In this case, θ1=approximately 65 degrees, and θ2=approximately 30 degrees.

Figure 2B:
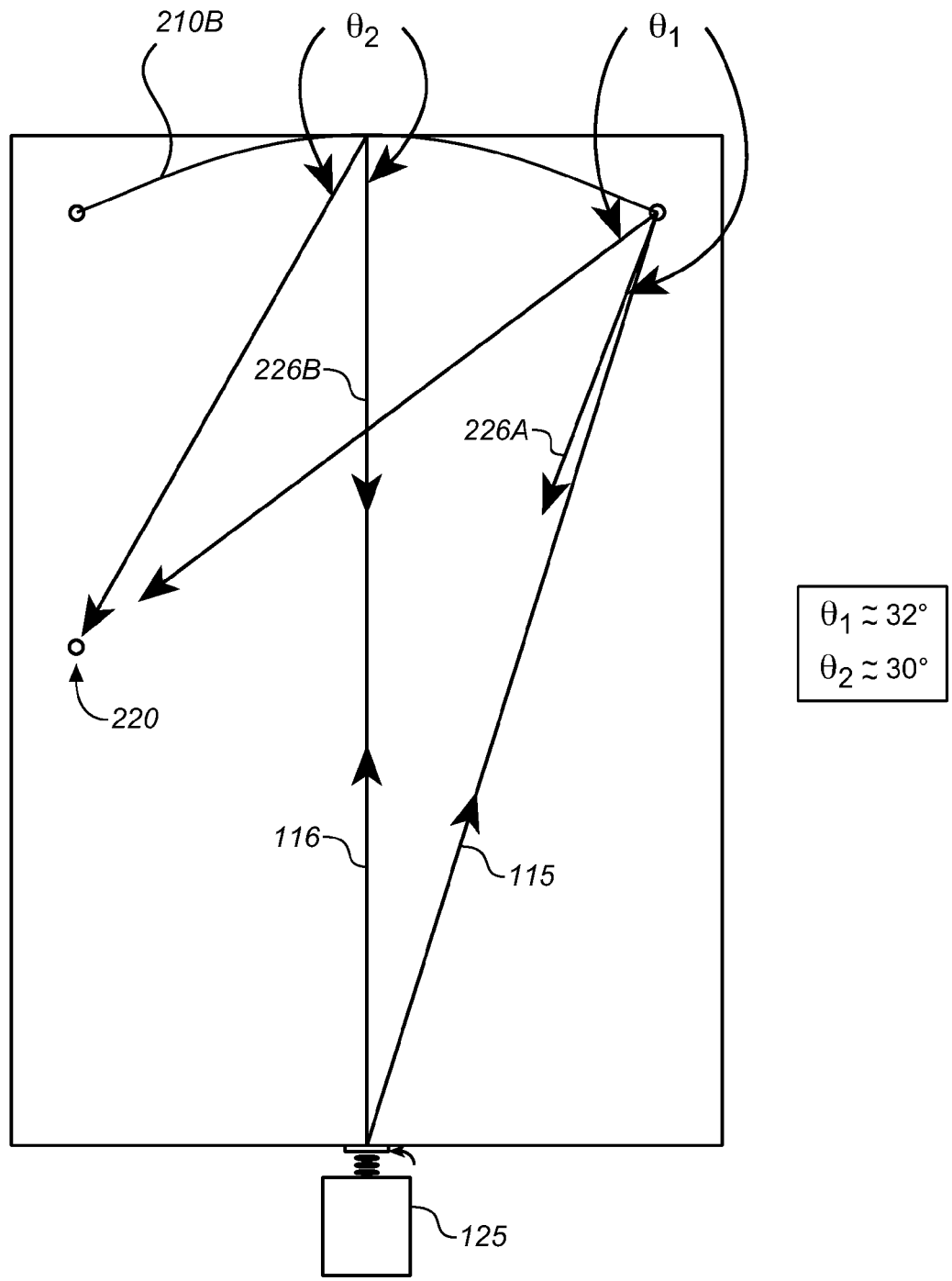
FIG. 2B is a diagram showing reflections in a cinema theater with a curved normal screen for a mid edge viewer.

FIG. 2B is a diagram showing reflections in a cinema theater with a curved normal screen 210B for the mid edge viewer 220. For the curved normal screen 210B, in this case, θ1 (the angle between specular reflection 226A, slightly inward from the incident light path, and the viewer)=approximately 32 degrees, and θ2 (the angle between specular reflection 226B, along incident light path, and the viewer)=approximately 30 degrees.

Figure 2C:
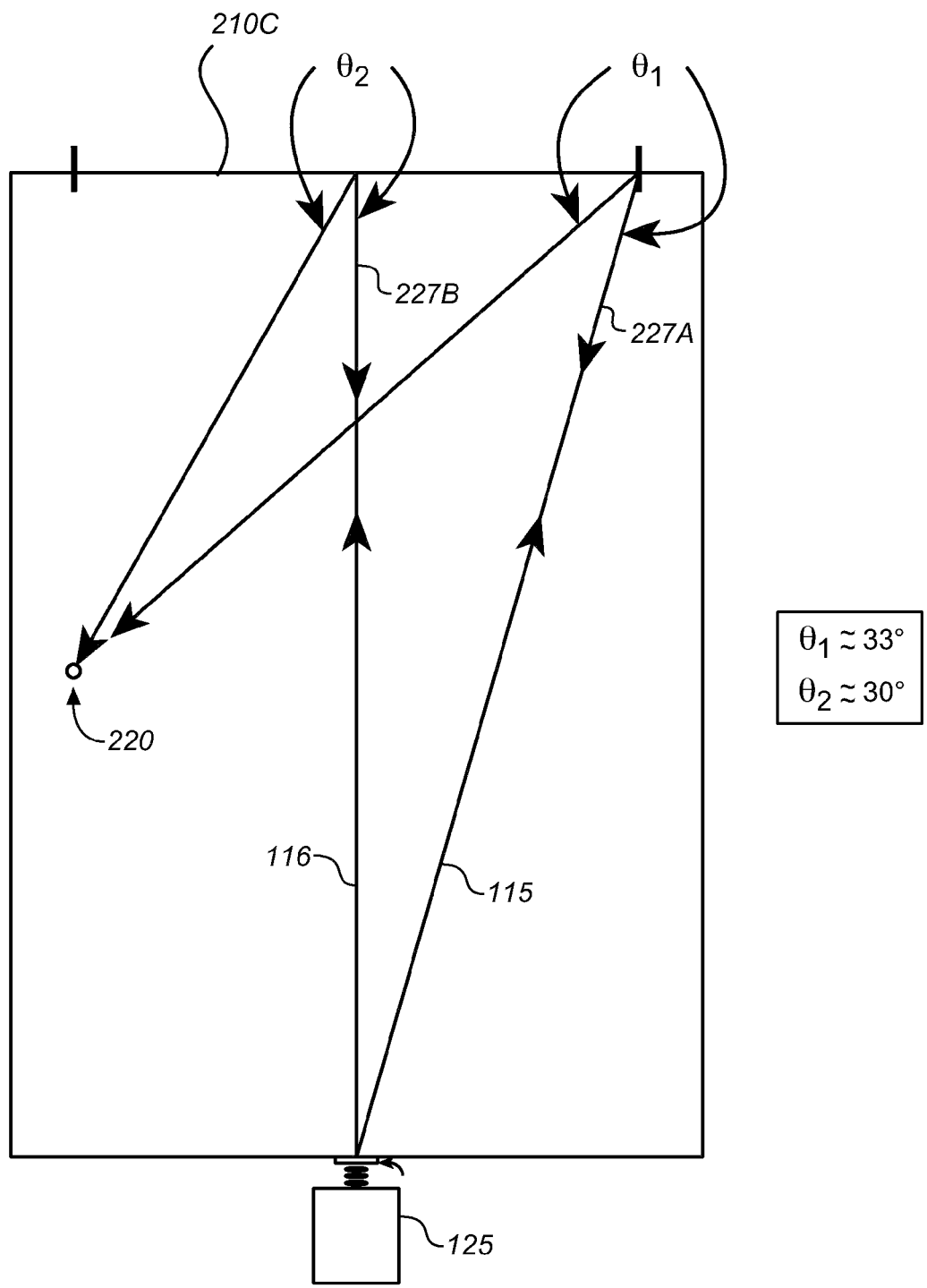
FIG. 2C is a diagram showing reflections in a cinema theater with a retro reflecting screen for a mid edge viewer.

FIG. 2C is a diagram showing reflections in a cinema theater with a flat retro reflecting screen 210C for a mid edge viewer 220. For the retro-reflecting screen 210C, in this case, θ1 (the angle between specular reflection 227A, along the light incident path, and the viewer)=approximately 33 degrees, and θ2 (the angle between specular reflection 227B, along the incident light path, and the viewer)=approximately 30 degrees.

Figure 3A:
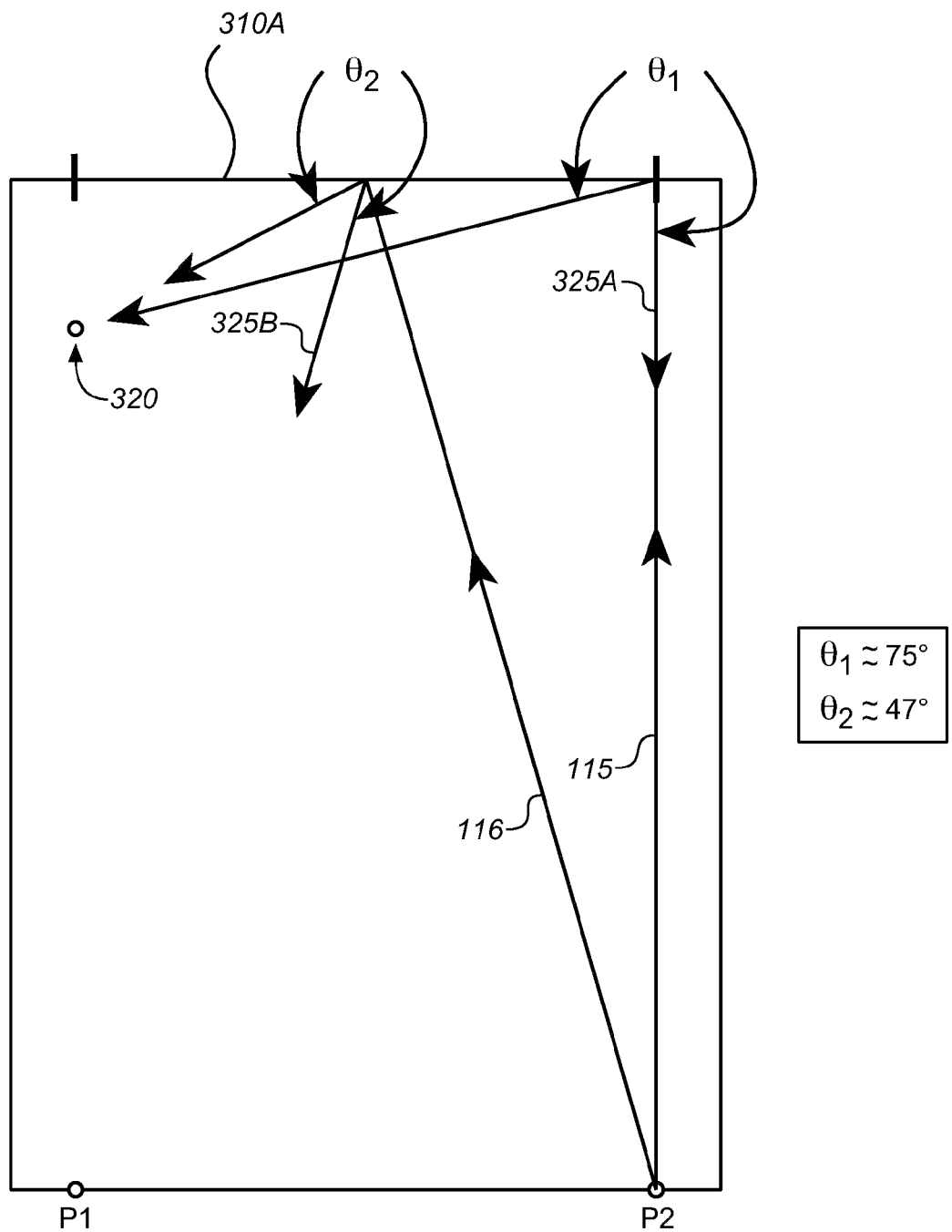
FIG. 3A is a diagram showing reflections in a cinema theater using widely spaced dual projectors with a flat normal screen for a worst case viewer.

FIG. 3A is a diagram showing reflections in a cinema theater using widely spaced dual projectors P1 and P2 with a flat normal screen 310A for a worst case viewer 320. Light from projector P2 strikes across the screen and is reflected to the worst case viewer 320, most notably at a far end of the screen 310A (angle θ1, the angle between specular reflection 325A, along the light incident path, and the viewer) and at screen center (angle θ2, the angle between specular reflection 325B and the viewer). In this case, θ1=approximately 75 degrees, and θ2=approximately 47 degrees. In each dual projector embodiment, the viewer would also receive supplemental illumination from the other projector (e.g., projector P1).

Accordingly, for a worst case viewer with a flat normal screen, moving to two widely spaced projectors, θ1 is improved over a single projector by approximately 15 degrees, and θ2 is improved by approximately 16 degrees.

Figure 3B:
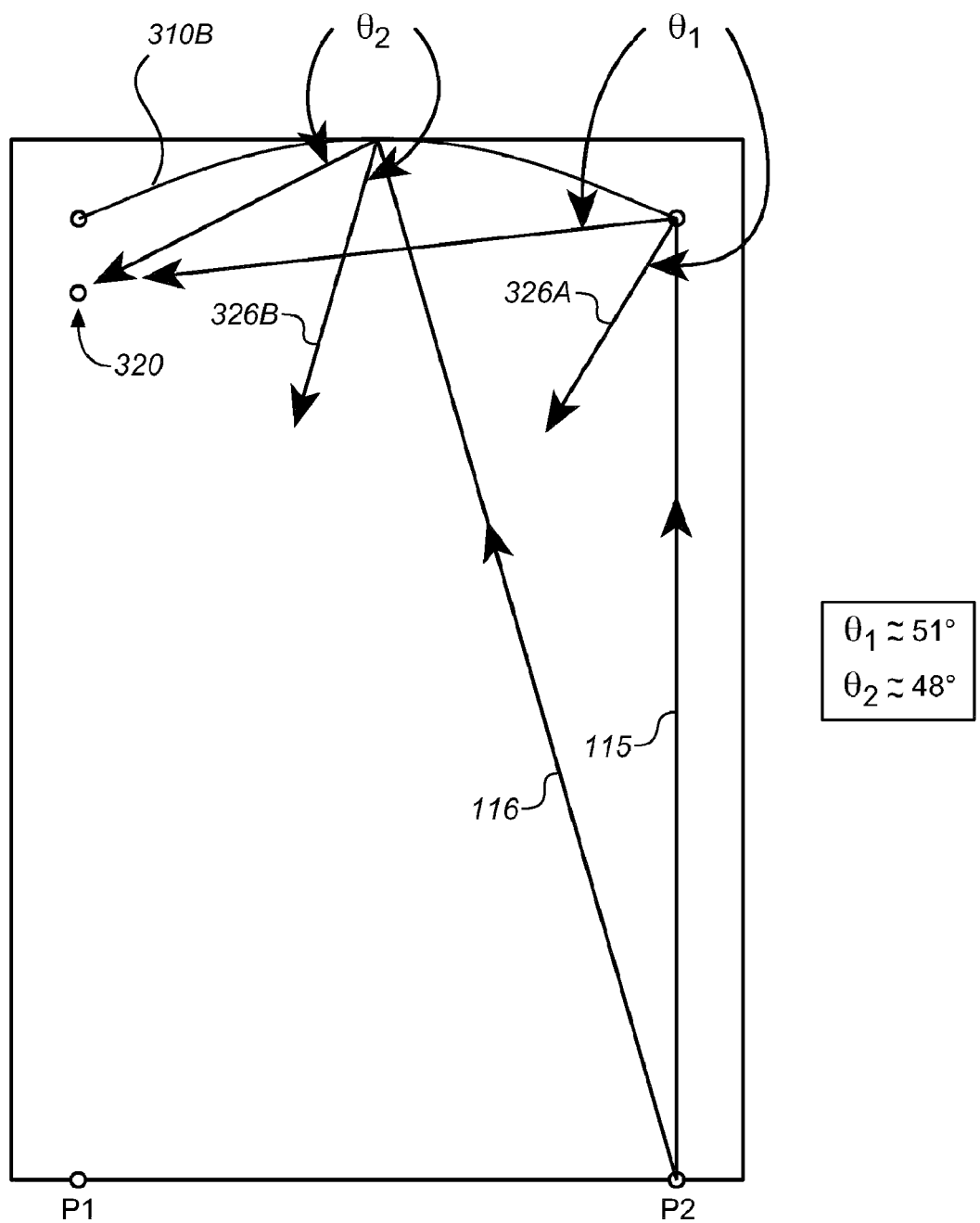
FIG. 3B is a diagram showing reflections in a cinema theater using widely spaced dual projectors with a curved normal screen for a worst case viewer.

FIG. 3B is a diagram showing reflections in a cinema theater using widely spaced dual projectors with a curved normal screen 310B for a worst case viewer 320. For the curved normal screen 310B, for projector P2, θ1 (the angle between specular reflection 326A, inward from the incident light path, and the viewer)=approximately 51 degrees, and θ2

(the angle between specular reflection 326B, outward of the incident light path, and the viewer)=approximately 48 degrees.

Accordingly, for a worst case viewer with a curved normal screen, moving to two widely spaced projectors, θ1 is improved over a single projector by approximately 11 degrees, and θ2 is improved by approximately 15 degrees.

Figure 3C:
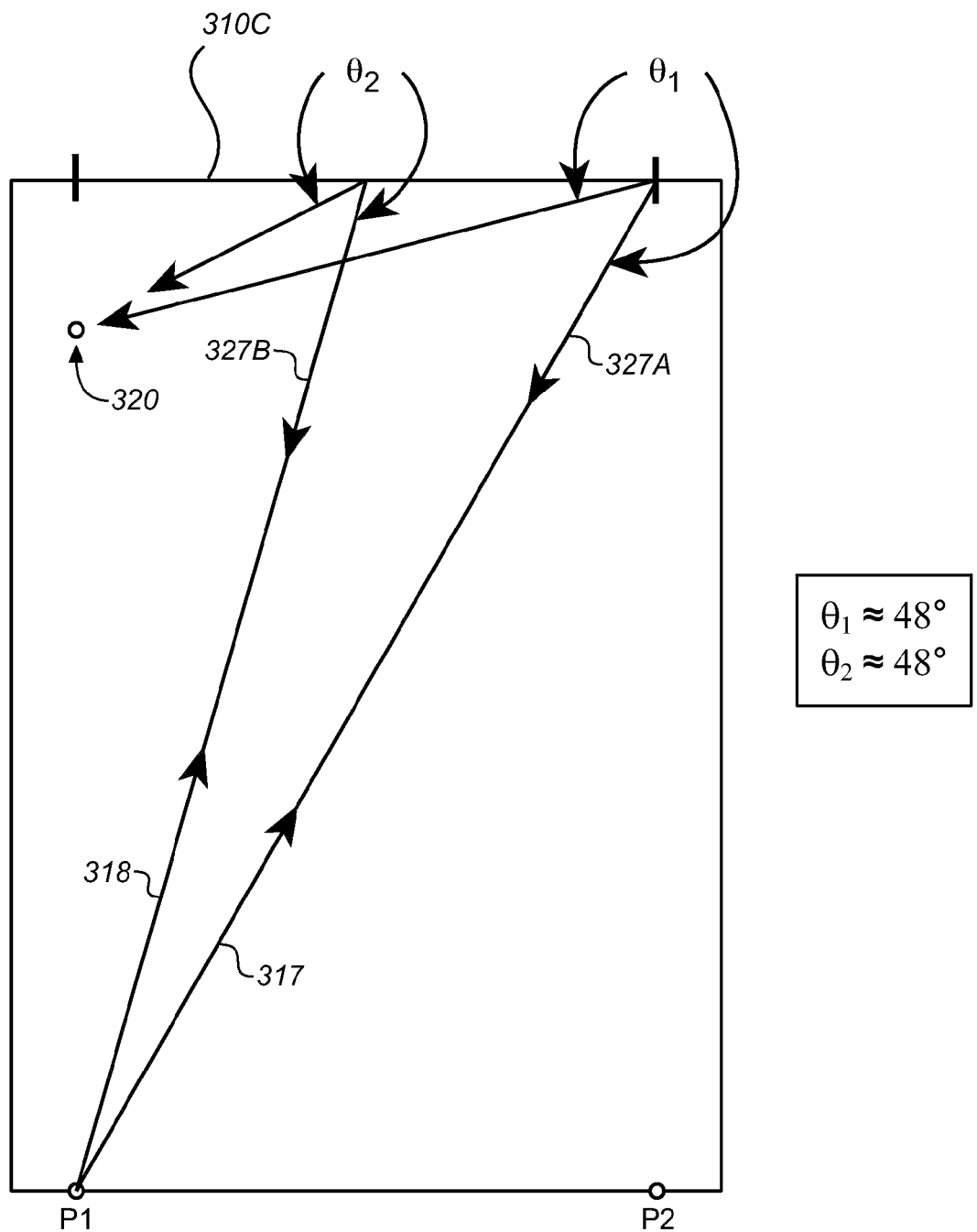
FIG. 3C is a diagram showing reflections in a cinema theater using widely spaced dual projectors with a retro reflecting screen for a worst case viewer.

FIG. 3C is a diagram showing reflections in a cinema theater using widely spaced dual projectors with a retro reflecting screen 310C for a worst case viewer 320. For the retro-reflecting screen 310C, for projector P1, θ1 (the angle between specular reflection 327A, along the light incident path, and the viewer)=approximately 48 degrees, and θ2 (the angle between specular reflection 327B, along the incident light path, and the viewer) =approximately 48 degrees.

Accordingly, for a worst case viewer, a retro-reflecting screen has approximately the same qualities as a curved normal screen. However, a worst case viewer viewing a retro-reflecting screen with 2 widely spaced projectors improves over a curved normal screen with one projector such that θ1 is improved by approximately 14 degrees, and θ2 is improved by approximately 17 degrees.

Figure 4A:
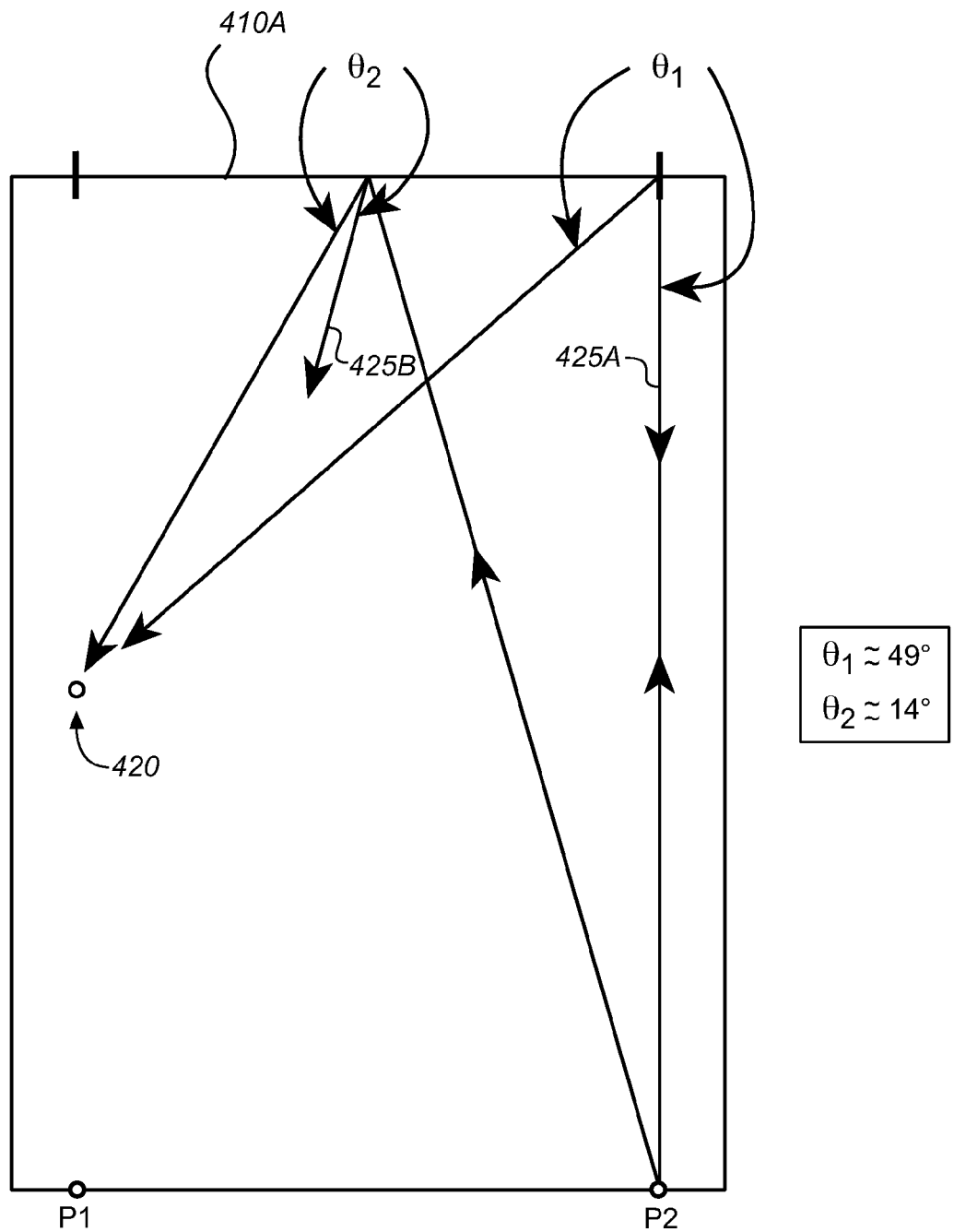
FIG. 4A is a diagram showing reflections in a cinema theater using widely spaced dual projectors with a flat normal screen for a mid edge viewer.

FIG. 4A is a diagram showing reflections in a cinema theater using widely spaced dual projectors with a flat normal screen 410A for a mid edge viewer 420. Light from projector P2 strikes across the screen and is reflected to the mid edge viewer 420, most notably at a far end of the screen 410A (angle θ1, the angle between specular reflection 425A and the viewer) and at screen center (angle θ2, the angle between specular reflection 425B and the viewer). In this case, θ1=approximately 49 degrees, and θ2=approximately 14 degrees. In each dual projector embodiment, the viewer would also receive supplemental illumination from the other projector (e.g., projector P1).

Accordingly, for a mid edge viewer with a flat normal screen, moving to two widely spaced projectors improves θ1 over a single projector installation by approximately 16 degrees (65 degrees-49 degrees), and θ2 is improved by approximately 16 degrees (30 degrees-14 degrees).

Figure 4B:
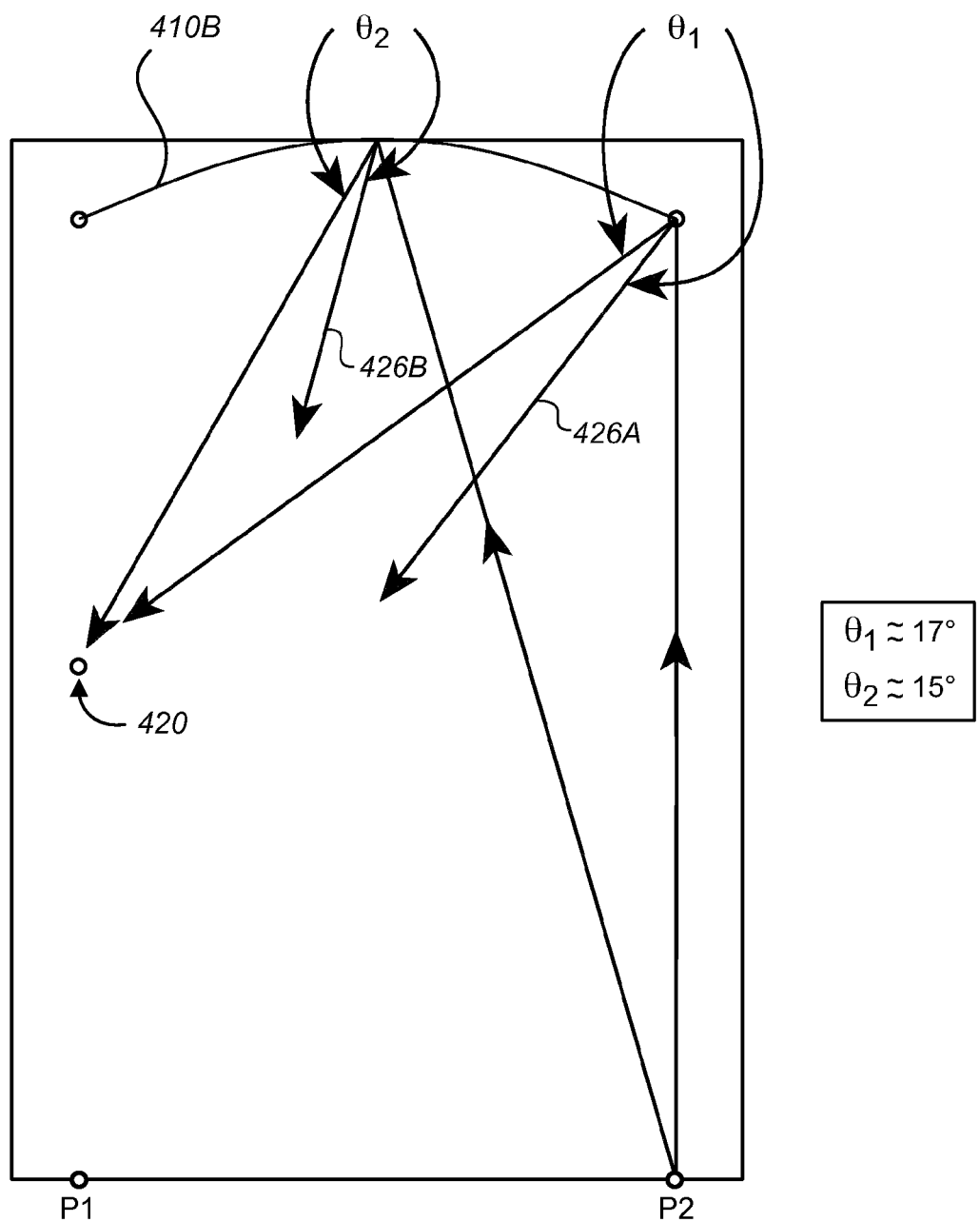
FIG. 4B is a diagram showing reflections in a cinema theater using widely spaced dual projectors with a curved normal screen for a mid edge viewer.

FIG. 4B is a diagram showing reflections in a cinema theater using widely spaced dual projectors with a curved normal screen 410B for the mid edge viewer 420. For the curved normal screen 410B, for projector P2, θ1 (the angle between specular reflection 426A, inward from the incident light path, and the viewer)=approximately 17 degrees, and θ2 (the angle between specular reflection 426B, outward of the incident light path, and the viewer)=approximately 15 degrees.

Accordingly, for a mid edge viewer with a curved normal screen, moving to two widely spaced projectors improves θ1 over a single projector by approximately 15 degrees (32 degrees-17 degrees), and θ2 is improved by approximately 15 degrees (30 degrees-15 degrees).

Figure 4C:
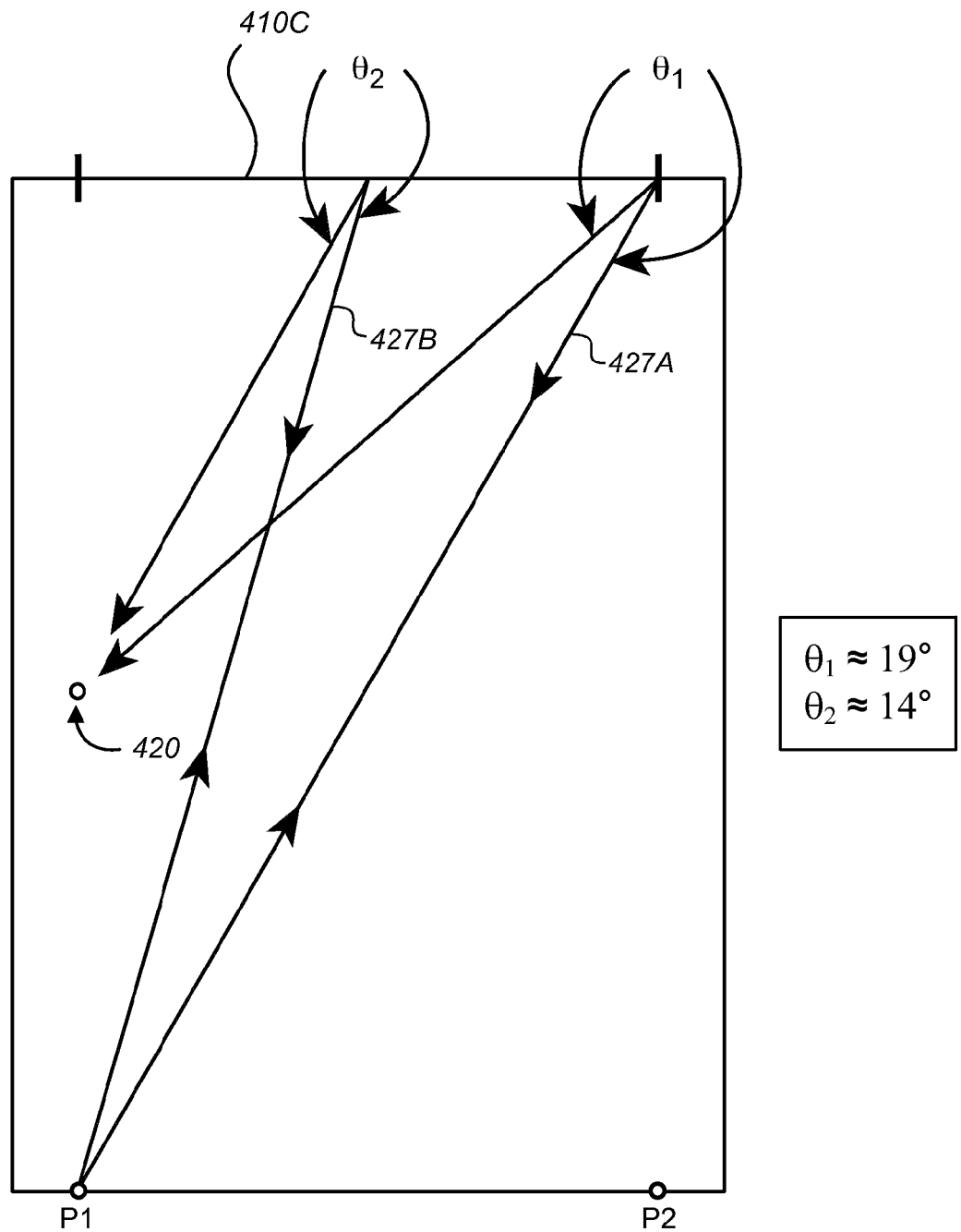
FIG. 4C is a diagram showing reflections in a cinema theater using widely spaced dual projectors with a retro reflecting screen for a mid edge viewer.

FIG. 4C is a diagram showing reflections in a cinema theater using widely spaced dual projectors with a retro reflecting screen 410C for a mid edge viewer. For the retro-reflecting screen 410C, for projector Pl, θ1 (the angle between specular reflection 427A, along the light incident path, and the viewer) =approximately 19 degrees, and θ2 (the angle between specular reflection 427B, along the incident light path, and the viewer)=approximately 14 degrees.

Accordingly, a retro-reflecting screen with dual projectors is improved over a curved normal screen with a center projector such that θ1 improves by approximately 13 degrees (32 degrees-19 degrees), and θ2 is improved by approximately 16 degrees (30 degrees-14 degrees).

The two projector systems described above (widely spaced) always result in smaller reflection angles and achieve overall higher gains for seat locations at the edge of the auditorium.

Other embodiments may also be described as dual projector systems having projector offset by more than a projector width. A projector spacing equivalent to a fractional portion of the width of the viewing screen may be utilized. For example, projector spacing may be any of ¼, ⅓, ½, ⅔, and ¾ a width (or close approximation thereof) of the viewing screen. The best advantage for uniformity and reduced hot spotting occurs with wider spacings. In various embodiments, the projectors are spaced apart by more than ¼ the width of the viewing screen. Preferably, the projectors are spaced as far apart as practical.

The spacing may depend on structural factors of the theater or projection booth in which the projectors are installed. In one embodiment, the projectors are spaced such that the projectors are adjacent to opposite walls. In one embodiment, the projectors are spaced at a full width of the viewing screen. In other embodiments, the projectors are both placed apart further than a width of the viewing screen.

The invention may be practiced with more than 2 projectors. For example, in one configuration 2 projectors at opposite side walls (e.g., at a back of a theater or forward of the back wall) are complimented with a center projector. The center projector may project from the back wall (e.g., a traditional theater projection location) or from a ceiling mounted location. An array of projectors may be utilized, for example, projectors at opposite side wall locations (e.g. ½ and/or ¾way from the screen to the back wall), and/or ceiling mounted locations (e.g., a centrally located ceiling, and/or widely spaced ceiling mounted projectors), and/or seating area floor mounted projector or projectors, and/or any number of back wall projectors (e.g., widely spaced dual projectors, and/or a center projector, and/or quad projectors).

In one embodiment, the projectors are spaced apart to a maximum amount corresponding to the projectors' (or server's) ability to correct for the trapezoidal effect and maintain a desired resolution of the projected images (and may also be limited by the physical dimensions of the theater). In one embodiment the desired resolution is an HD resolution. In another embodiment the desired resolution, brightness, contrast, and color gamut is within Visual Dynamic Range (VDR) specifications. Alternatively, the specifications may exceed the normal range of human vision. In one embodiment, the characteristics of the display are designed to meet a 500 nit brightness level, HD or better resolution, 2000:1 in scene contrast ratio, 10,000:1 dynamic contrast ratio, and a color gamut above the Digital Cinema Initiative (DCI) specification for P3 (a.k.a., DCI-P3). In yet another embodiment the desired resolution is a native resolution of the motion pictures provided to the cinema and/or projectors.

In one embodiment a first of the dual projectors is configured to alternately project a first channel of a 3D image and then a second channel. The second projector also being configured to alternately project the first and second channels. For improved smoothness, the projectors may be inversely synchronized such that when the first projector is projecting the second channel, the second projector is projecting the first channel and visa versa. The projections are made onto a screen having high directivity (e.g., greater than 2.0). In various embodiments, the directivity is 3.0 or greater. In various embodiments, the screen is a retro-reflective screen. In one embodiment, more than 3 projectors are utilized (e.g., 4 projectors that may include 2 projectors projecting from side wall areas of the theater and 2 projectors projecting from a back wall areas of the theater).

In one embodiment, the invention comprises a projection system having a first projector and a second projector spaced apart more than one projector width (e.g., 3 or more projector widths, or spaced apart more than 10 feet), wherein the first projector is configured to project a first direction trapezoidal corrected image and the second projector is configured to project a second (and opposite) direction trapezoidal corrected image. The first projector may be closer to a first side wall of a theater than a center of the theater and the second projector may be closer to an opposite side wall of the theater than the center (e.g., the first projector is adjacent to the first side wall and the second projector is adjacent to the opposite side wall). In a projection booth, the projectors may be positioned at or past the side walls as the lens of each projector only needs a clear path to the screen. Both projectors may also be along the back wall of the theater (e.g., in the projection booth) or at a predetermined location between the screen and the back wall.

Space between the projectors and any closest wall may comprise solely an operation space for maintaining the projectors. The trapezoidal corrections may comprise corrections for image registration errors caused by more than 5 feet of separation between the projectors. The trapezoidal corrections may comprise corrections for image registration errors caused by placement of the projectors at opposite side walls of the theater and, for example, more than 5 feet of separation. A trapezoidal correction device may be configured to prepare image data and/or cause an image to be modulated that is inversely proportional to trapezoidal distortions that would occur on a viewing screen without the correction due to the projectors being spaced apart more than ¼ a width of the screen.

The first and second projectors may be configured to project 3D images. The 3D images may comprise left and right channel images separated by polarization.

Figure 5:
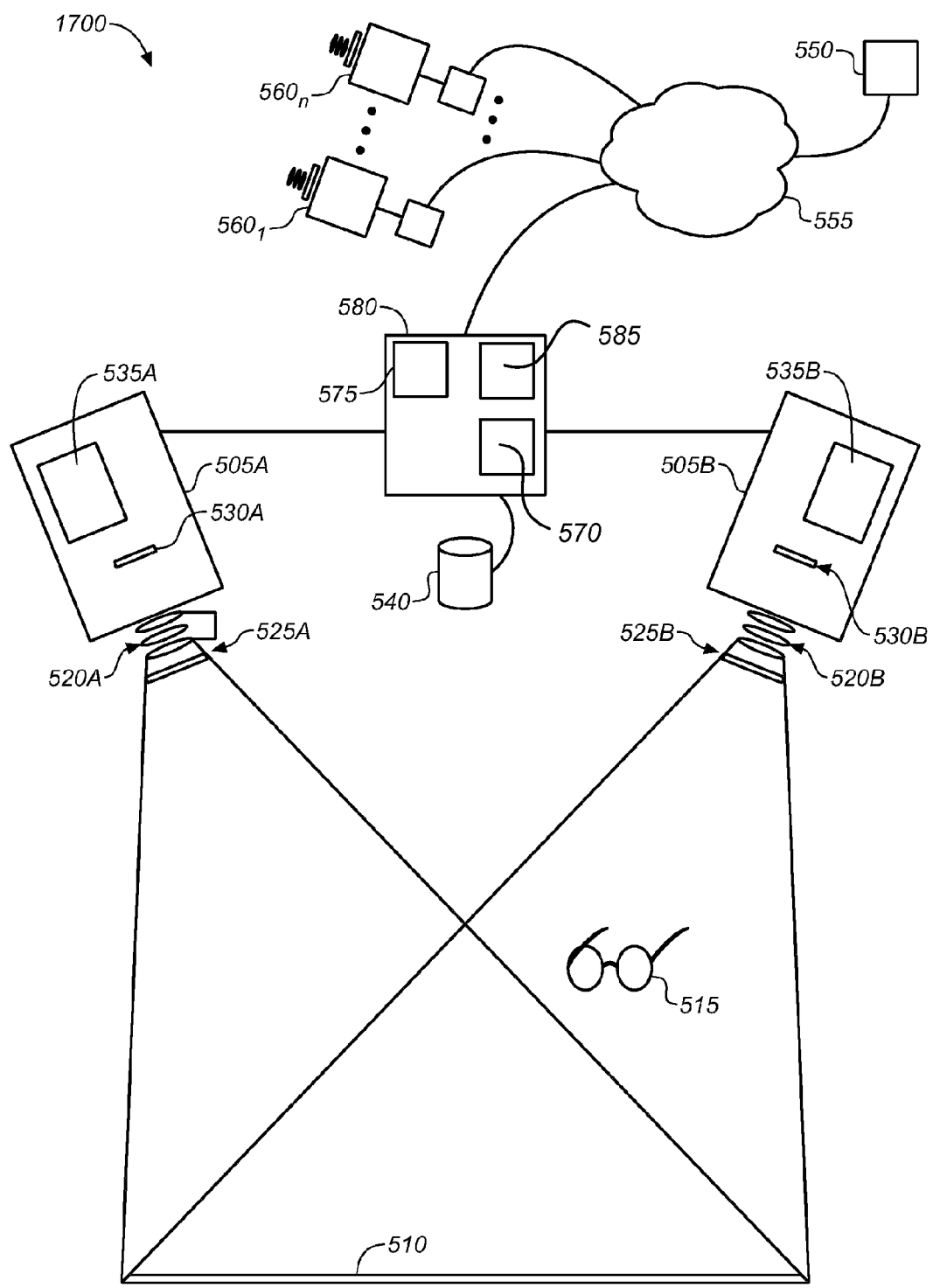
FIG. 5 is a diagram illustrating widely spaced dual projectors according to embodiments of the present invention.

FIG. 5 is a diagram illustrating widely spaced dual projectors according to embodiments of the present invention. A projection system 500 includes a first digital cinema projector 505A and a second digital cinema projector 505B that project 2D or 3D images (e.g. a left channel image and a right channel image). As shown, the projectors are angled so that they illuminate the screen. The projectors may comprise, for example, standard bulb illuminated projectors or laser based projectors.

The 3D embodiments may be, for example, spectrally separated or polarization based systems. The projectors may then project through projection filters or polarization converting screens (e.g., filters 530A/B, or z-type screens 525A/B) onto a screen 510 for viewing with glasses 515. Preferably, the filters/screens alternate polarization orientation or spectral properties in time with alternating frames from opposite channels projected from the projectors, e.g., as synchronized by a controller 570 of a server 580.

Glasses 515 include, for example, spectrally separated filters disposed as coatings on each lens of the glasses such that the right lens comprises a filter that matches or encompasses the passbands of the right channel filter and the left lens comprises a filter that matches or encompasses passbands of the left channel filter (each of the left and right channel images are intended to be viewed by a viewer's corresponding left or right eye through the corresponding left or right eye lens/filter of the glasses). The glasses 515, and system 500, may, for example, include any of the features, systems, or devices described in Richards et al., a U.S. patent entitled METHOD AND SYSTEM FOR SHAPED GLASSES AND VIEWING 3D IMAGES, U.S. Pat. No. 7,784,938, issued Aug. 31, 2010, the contents of which are incorporated herein by reference as if specifically set forth. For polarization based systems, glasses 515 may also be polarization based (e.g., left and right circularly polarized lenses) matching polarized projections of each corresponding channel.

The projectors 505A/B receive image data for projection, for example, from server 580. Content (e.g., 3D content) is provided to the server 580 from, for example, a disk drive 540. Alternatively, content may be transmitted to projectors 505A/B over a secure link of network 555 from, for example, an image warehouse or studio 550. Multiple other projectors (e.g., at theaters around the globe, $560.sub.1 \ldots 560n$) may also feed from a similar network or other electronic or wireless connections including wireless networks, satellite transmission, or quality airwave broadcasts (e.g., High Definition or better broadcast).

The server 580 may include a color correction module 575. The server 580 may include ghost busting algorithms to be applied to image content to correct, for example, crosstalk issues or other artifacts.

The server 580 also includes image correction capabilities 585 (e.g., a compensation mechanism, a processor, etc.) to account for the trapezoidal effect from the spaced apart projectors. The trapezoidal effect correction corrects for registration of the two images (to cause the image from projector 505A to be registered with the image projected from projector 505B). The correction may be performed by shifting pixel data on modulators of the projectors such that corresponding pixels in an image being projected by each projector illuminate a same pixel area of the screen 510. Such adjustments are performed at the server 580 or by first and second correction mechanisms 535A and 535B (e.g., programming/electronics) resident in each projector 505A and 505B, respectively. Alternatively, the image data may be pre-shifted before delivery to the server/projectors and/or theaters. The screen 510 is a high directivity screen comprising, for example, a directivity rating greater than 2. In one embodiment, the screen 510 has a directivity rating of 2.4. In yet another embodiment, the screen 510 has a directivity rating of 3.0. In still yet another embodiment, the screen 510 is retro-reflective.

Figure 6:
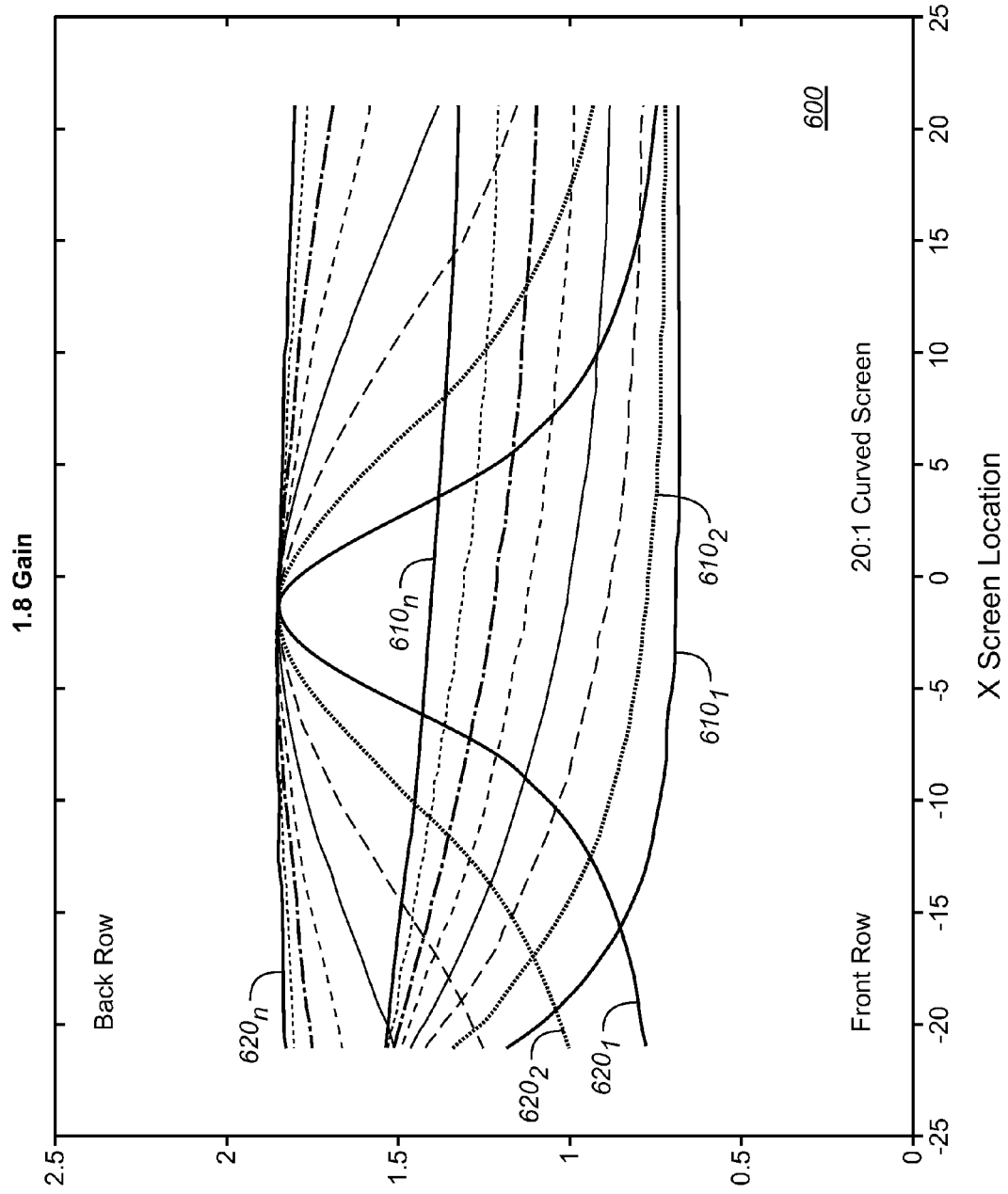
FIG. 6 is a performance graph of left and center isle seating positions in a theater using a single projector and a 1.8 gain screen.
Figure 7:
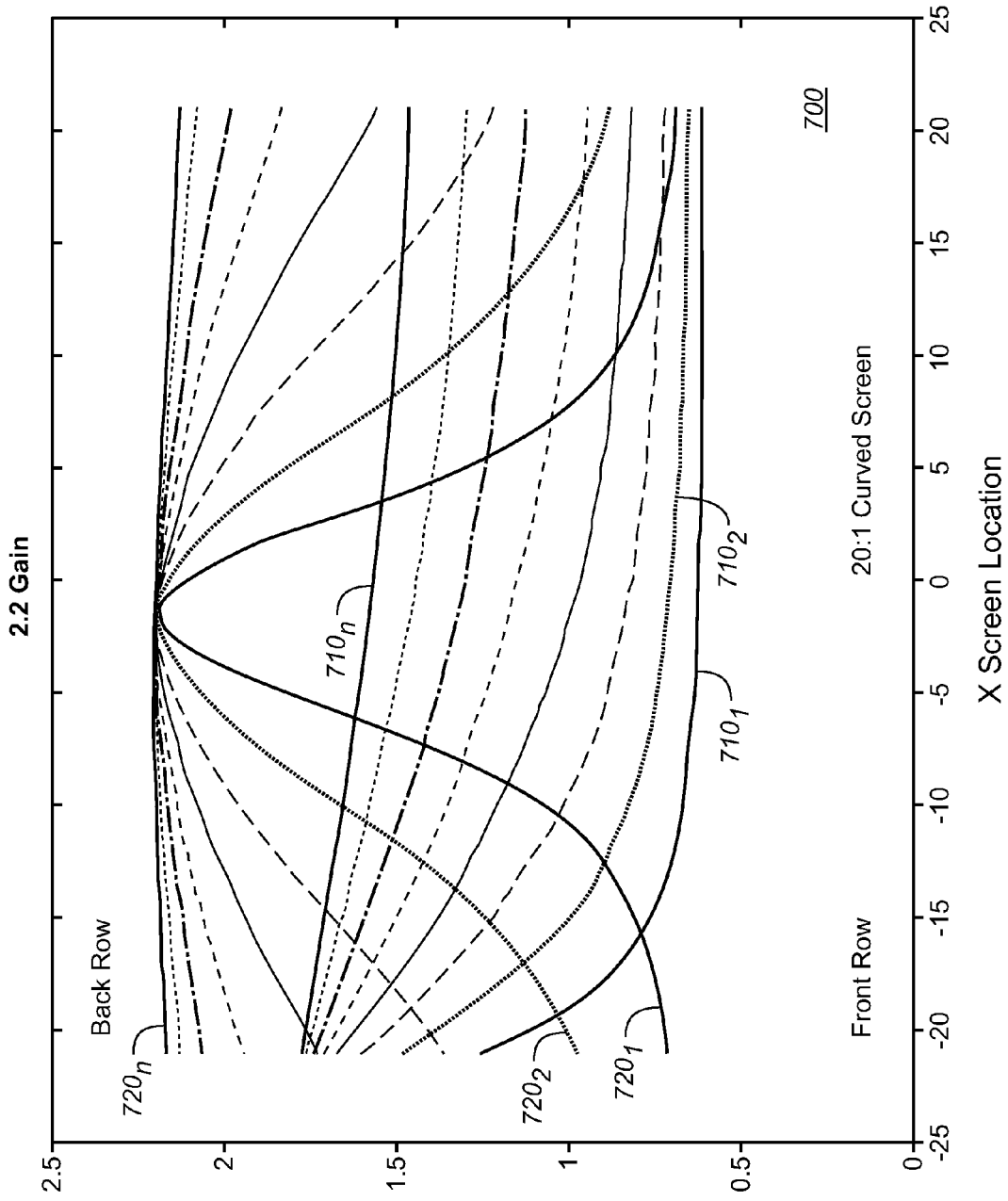
FIG. 7 is a performance graph of left and center isle seating positions in a theater using a single projector and a 2.2 gain screen.
Figure 8:
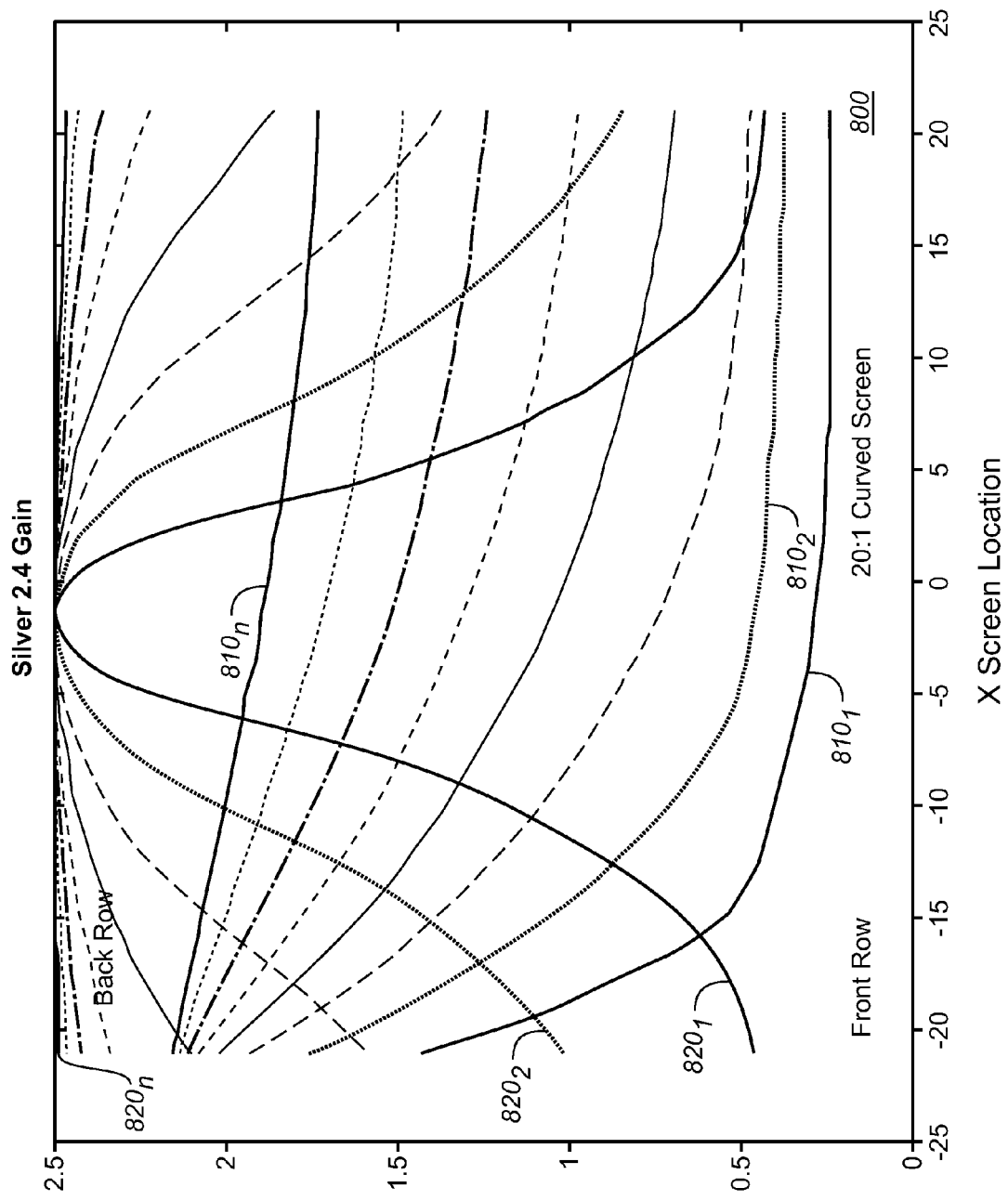
FIG. 8 is a performance graph of left and center isle seating positions in a theater using a single projector and a 2.4 gain screen.

FIGS. 6, 7, and 8 provide performance data for typical theater installations with single projectors. More specifically, FIG. 6 is a performance graph 600 of left and center isle seating positions in a theater using a single projector and a 1.8 gain screen. As shown in FIG. 6, a gain of left isle seating (encompassing the worst case seating position in the first row) comprises gain curves that equate to increasing rows from a front row $610_1$ to a back row $610_n$. The curves do not represent every row but show approximately equidistant increments from the first row to the back row. Similarly, a center isle position is shown from a front row $620_1$ to a back row $620_n$.

FIG. 7 is a performance graph 700 of left and center isle seating positions in a theater using a single projector and a 2.2 gain screen. FIG. 7 shows gain curves for increasing distance from a front row to a back row for the left isle (curves $710_1$ to $710_n$) and a center isle (curves $720_1$ to $720_n$).

FIG. 8 is a performance graph 800 of left and center isle seating positions in a theater using a single projector and a 2.4 gain screen. FIG. 8 shows gain curves for increasing distance from a front row to a back row for the left isle (curves $810_1$ to $810_n$) and a center isle (curves $820_1$ to $820_n$).

Figure 9:
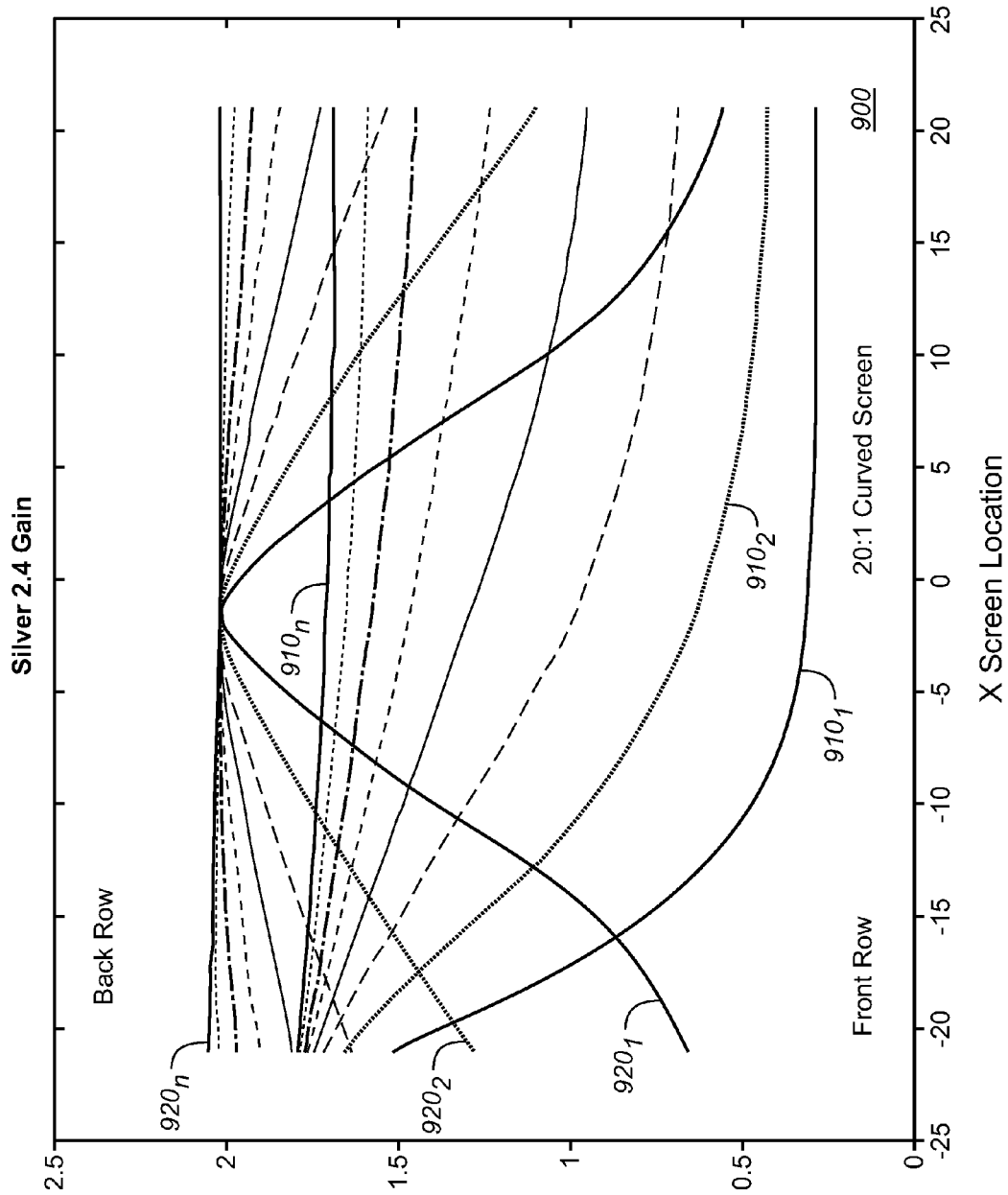
FIG. 9 is a performance graph of left and center isle seating positions in a theater using widely spaced dual projectors located at opposite side walls, and a 2.4 gain screen, according to an embodiment of the present invention.
Figure 10:
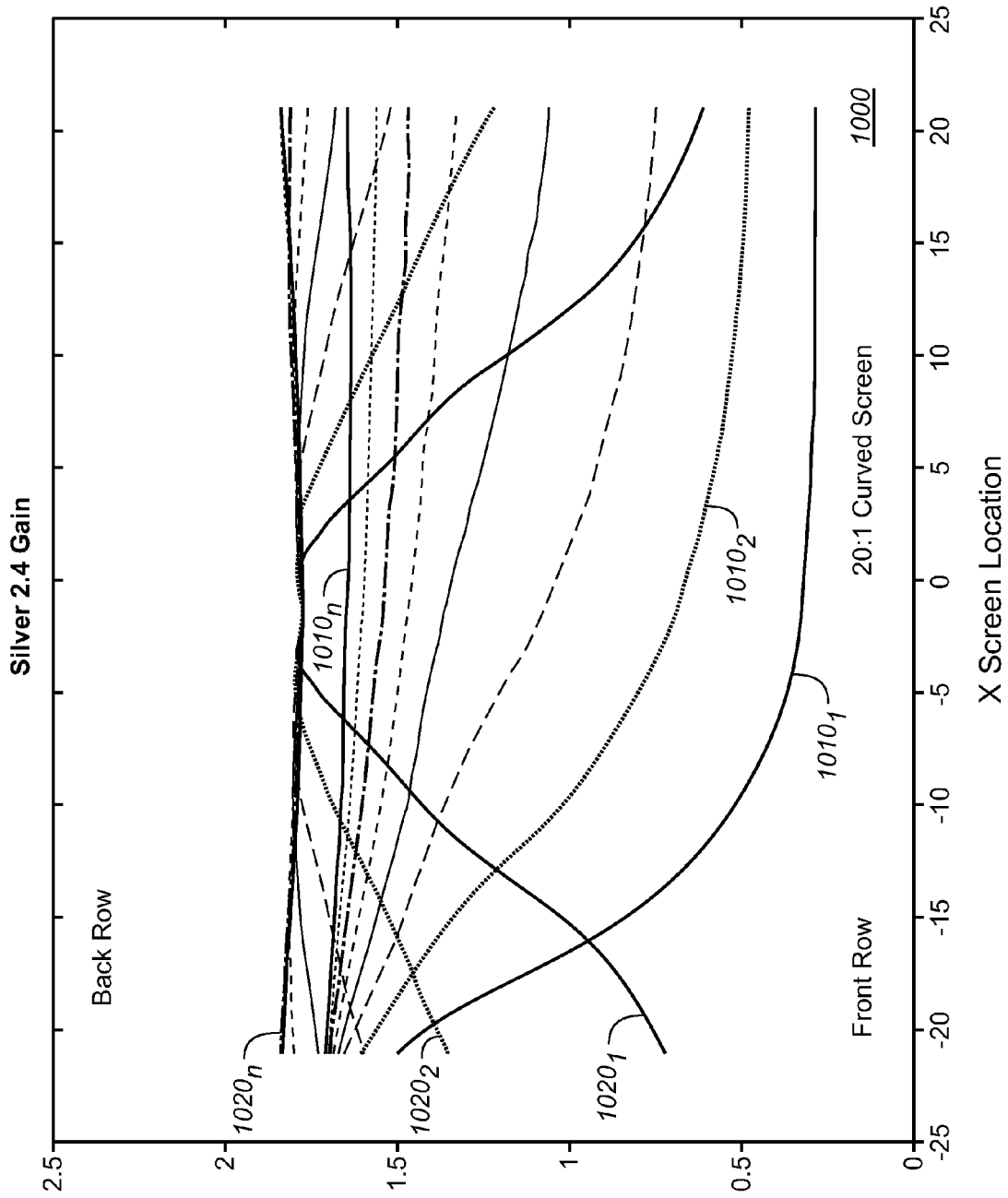
FIG. 10 is a performance graph of left and center isle seating positions in a theater using widely spaced dual projectors located on opposite side walls of the theater at approximately $\frac{1}{10}^{th}$ a distance to the screen forward of the back wall, and a 2.4 gain screen, according to an embodiment of the present invention.
Figure 11:
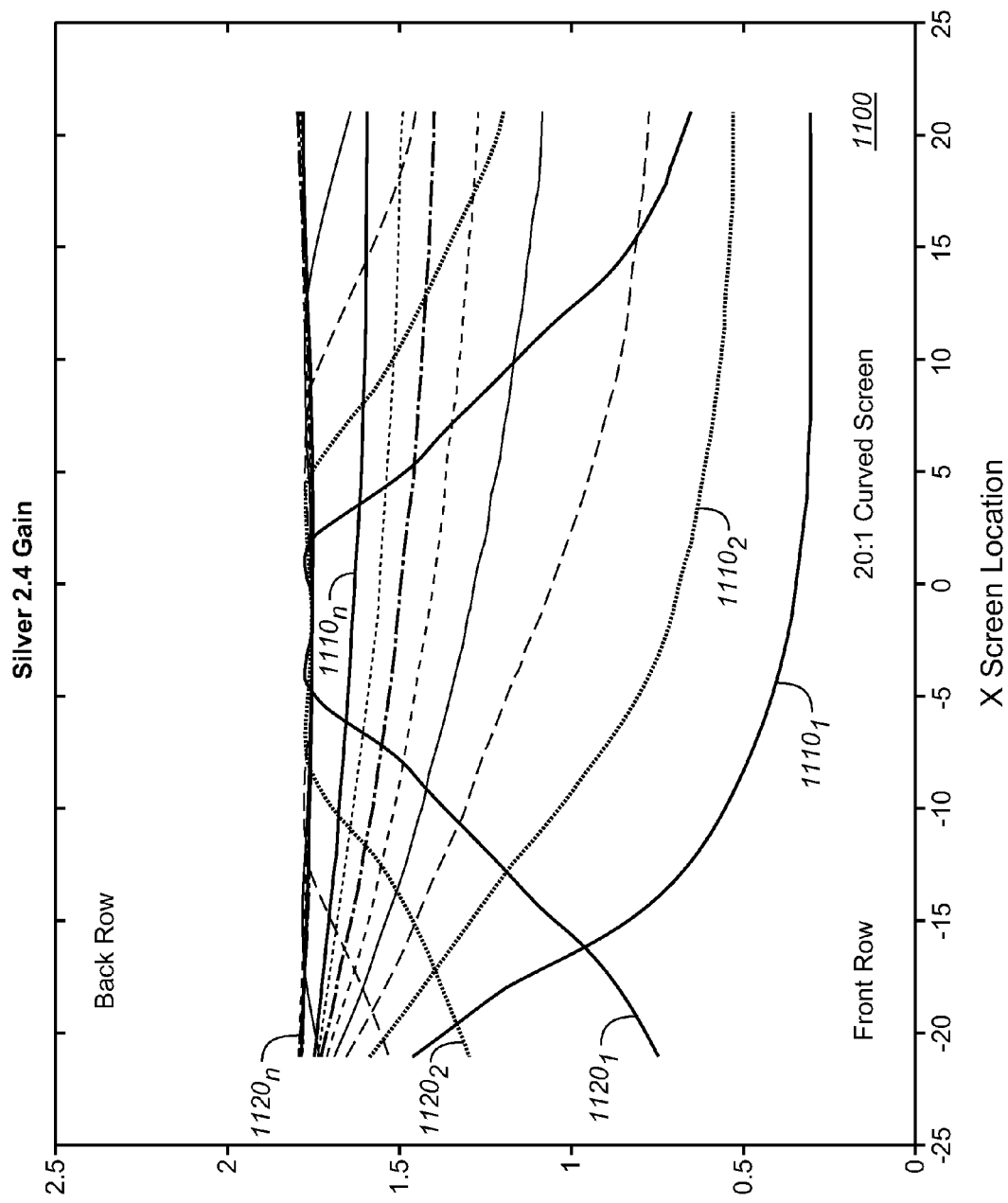
FIG. 11 is a performance graph of left and center isle seating positions in a theater using a triple projector configuration with 2 projectors located on opposite side walls of the theater approximately $\frac{1}{5}^{th}$ a distance to the screen forward of the back wall, one projector at the center of the auditorium, and a 2.4 gain screen, according to an embodiment of the present invention.

FIGS. 9, 10 and 11 illustrate a flattening of gain for several theater installations and corresponding performance improvements according to embodiments of the present invention. For example, FIG. 9 is a performance graph 900 of left and center isle seating positions in a theater using a dual projector and a 2.4 gain with the projectors located at opposite sides on the back wall (e.g., 25 feet from the center of the back wall in a 50 ft. wide auditorium). The projectors are ½ power projectors, so the gain figures can be more easily compared to single projector installations. FIG. 9 shows gain curves for increasing distance from a front row to a back row for the left isle (curves $910_1$ to $910_n$) and a center isle (curves $920_1$ to $920_n$). As can be seen in FIG. 9, the measured gain is generally lower than in the single projector installation of FIG. 8, but the gain across all seat locations is substantially flatter. FIG. 9 also illustrate higher gain and flatter gain curve than the single projector 2.2 gain screen example in FIG. 7.

FIG. 10 is a performance graph 1000 of left and center isle seating positions in a theater using a dual projector and a 2.4 gain with the projectors located on the side walls and $\frac{1}{10}^{th}$ a distance to the screen forward of the back wall (e.g., feet forward of the back wall in a 70 ft. length auditorium). Again, the projectors modeled are ½ power. FIG. 10 shows gain curves for increasing distance from a front row to a back row for the left isle (curves $1010_1$ to $1010_n$) and a center isle (curves $1020_1$ to $1020_n$). As can be seen in FIG. 10, the curves are substantially flatter (especially in the center). Although the gain goes down (roughly equivalent to the 1.8 gain screen example of FIG. 6) it is much flatter.

FIG. 11 is a performance graph 1100 of left and center isle seating positions in a theater using a triple projector and a 2.4 gain with two projectors located on the side walls and approximately $\frac{1}{5}^{th}$ a distance to the screen from the back wall (e.g., 15 feet forward of the back wall in a 70 ft. length auditorium), and a third projector located at the center of the back wall. In this case, the projectors modeled are ⅓ power. FIG. 11 shows gain curves for increasing distance from a front row to a back row for the left isle (curves $1110_1$ to $1110_n$) and a center isle (curves $1120_1$ to $1120_n$). As can be seen in FIG. 11, the triple projector implementation produces an exceedingly flat gain curve.

It is noted again the FIGS. 9, 10, and 11, illustrate reduced power projectors which allows a fair comparison to single projector models. The ultimate brightness of any projections would of course be increased with full power projections and would maintain the desirable flat gain characteristics.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing projectors having standard or laser illumination, any equivalent device, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to projectors, projector placement, viewing screens, filters, polarization screens, content, content corrections, etc. should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, calculating and/or correcting for trapezoidal effects, including trapezoidal effects occurring because of spacing between projectors, color correction, energizing modulating devices according to image data and any applied corrections, registration of images, and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A projection system, comprising a screen and at least two widely spaced digital projectors for projecting images defined by image data, wherein the at least two projectors are angled so that they illuminate the screen,
   wherein the image data are pre-shifted before delivery to the projection system in order to compensate for a trapezoidal effect caused by projecting images from the at least two widely spaced digital projectors,
   wherein the compensation for the trapezoidal effect comprises shifting where pixels of an image to be projected are modulated on modulators of at least one of the projectors such that the pixels of the at least two projectors are projected onto a same portion of the screen, and
   wherein the at least two projectors are spaced apart as widely as possible within a theater in which the projection system is installed and within the limitations of the compensation for the trapezoidal effect, thereby maintaining the projectors' ability to correct for a trapezoidal effect associated with the projected images to ensure a target resolution of the projected images.

2. The projection system according to claim 1, wherein the screen comprises a high gain screen.

3. The projection system according to claim 1, wherein the screen comprises a curved screen.

4. The projection system according to claim 1, wherein the projectors are spaced as widely as possible within a theater in which the system is installed and within any limitations of the compensation.

5. The projection system according to claim 1, wherein a first of the at least two widely spaced projectors is configured to alternately project a first channel of a 3D image or motion picture and then a second channel, and
wherein a second of the at least two widely spaced projectors is configured to alternately project the first and second channels such that the first projector is projecting the second channel, while the second projector is projecting the first channel and vice versa.

6. The projection system according to claim 1, wherein the projectors are laser based projectors.

7. The projection system according to claim 6, further comprising a processor configured to input an image to be displayed and output a modulation scheme for energizing a modulator of the projection system to compensate for the trapezoid effect incurred due to the wide spacing of the projectors.

8. The projection system according to claim 1, wherein the widely spaced projectors are positioned on opposing sides at a rear of a theater.

9. The projection system according to claim 1, wherein a first of the projectors is closer to a first side wall of a theater than a center of the theater and a second of the projectors is closer to an opposite side wall of the theater than the center.

10. The projection system according to claim 9, wherein directivity of the screen is greater than 2.

11. The projection system according to claim 1, wherein the screen is a high gain screen positioned to display images projected by the projectors, and wherein the projection system further comprises:
a first correction mechanism configured to correct a first trapezoidal effect in images projected by a first of the projectors;
a second correction mechanism configured to correct a second trapezoidal effect in images projected by a second of the projectors;
a first z-type screen configured to alternate polarization of images projected by the first projector;
a second z-type screen configured to alternate polarization of images projected by the second projector; and
a controller configured to synchronize each projected image projected by the projectors with a polarization matching a corresponding 3D channel of the projected image.

12. The projection system according to claim 11, wherein at least one of the first and second correction mechanisms causes an image to be projected that is inversely proportional to trapezoidal distortions that would occur on a viewing screen without the correction due to the projectors being spaced apart more than ¼ a width of the screen.

13. The projection system according to claim 12, wherein the at least two widely spaced projectors are configured to alternate between projecting right and left channel images of a 3D image or motion picture.

14. A method for setting up a projection system comprising a screen and at least two projectors for projecting images defined by image data, wherein the at least two projectors are angled so that they illuminate the screen,
wherein the image data are pre-shifted before delivery to the projection system in order to compensate for a trapezoidal effect caused by projecting images from the at least two widely spaced digital projectors,
wherein the compensation for the trapezoidal effect comprises shifting where pixels of an image to be projected are modulated on modulators of at least one of the projectors such that the pixels of the at least two projectors are projected onto a same portion of the screen,
the method comprising spacing apart the at least two projectors as widely as possible within a theater in which the projection system is installed and within the limitations of the compensation for the trapezoidal effect, thereby maintaining the projectors' ability to correct for a trapezoidal effect associated with the projected images to ensure a target resolution of the projected images.

15. The method according to claim 14, wherein the at least two projectors are configured to project the images onto a high directivity screen.

16. The method according to claim 15, wherein directivity of the screen is greater than 2.

17. The method according to claim 16, wherein the screen comprises a retro-reflecting screen.

18. The method according to claim 16, wherein the projectors' ability to correct for a trapezoidal effect associated with the projected images is barely maintained to ensure a target resolution of the projected images.

19. The method according to claim 16, wherein the at least two projectors are configured to alternate between projecting right and left channel images of a 3D image or motion picture.

20. A projection system comprising:
a screen; and
at least two digital projectors widely spaced from each other, each of the widely-spaced digital projectors configured to project images on the screen and including a modulator for modulating light according to the image data;
at least one correction mechanism configured to receive the image data for at least one of the digital projectors, to correct the image data for trapezoidal effect induced in the image data by the wide spacing of the digital projectors such that the light modulated by the pixels of each of the digital projectors is projected onto a same portion of the screen, and to provide the corrected image data for assertion on the modulator of the at least one digital projector; and wherein
the at least one correction mechanism corrects for the trapezoidal effect by shifting where pixels of an image defined by the image data are modulated on the modulator of an associated one of the digital projectors; and
the at least two digital projectors are separated by at least 5 feet and within the limitations of the at least one correction mechanism to correct for the trapezoidal effect.

21. The projection system according to claim 20, wherein the at least one correction mechanism is embodied in a media server operative to provide image data for each of the digital projectors.

22. The projection system according to claim 20, further comprising:
a first correction mechanism configured to correct a first trapezoidal effect in images projected by a first one of the digital projectors; and a second correction mechanism configured to correct a second trapezoidal effect in images projected by a second one of the digital projectors.

23. The projection system according to claim 20, wherein the at least two digital projectors are configured to project different channels of a 3D image.

\* \* \* \* \*